US009521509B2

(12) United States Patent
Raghupathy et al.

(10) Patent No.: US 9,521,509 B2
(45) Date of Patent: *Dec. 13, 2016

(54) WIDE AREA POSITIONING SYSTEM

(71) Applicant: NextNav, LLC, Sunnyvale, CA (US)

(72) Inventors: Arun Raghupathy, Bangalore (IN); Ganesh Pattabiraman, Los Gatos, CA (US); Subramanian S Meiyappan, San Jose, CA (US); Hari Sankar, Santa Clara, CA (US)

(73) Assignee: NextNav, LLC, Sunnyvale, CA (US)

( * ) Notice: Subject to any disclaimer, the term of this patent is extended or adjusted under 35 U.S.C. 154(b) by 375 days.

This patent is subject to a terminal disclaimer.

(21) Appl. No.: 14/138,412

(22) Filed: Dec. 23, 2013

(65) Prior Publication Data

US 2014/0292580 A1    Oct. 2, 2014

Related U.S. Application Data

(63) Continuation of application No. 13/412,487, filed on Mar. 5, 2012, now Pat. No. 8,629,803, which is a
(Continued)

(51) Int. Cl.
*G01S 1/08* (2006.01)
*H04W 4/02* (2009.01)
(Continued)

(52) U.S. Cl.
CPC ............ *H04W 4/02* (2013.01); *G01S 1/08* (2013.01); *G01S 5/10* (2013.01); *G01S 19/11* (2013.01);
(Continued)

(58) Field of Classification Search
CPC ............ G01S 1/08; G01S 19/11; G01S 19/46; G01S 5/10; G01S 19/24; H04W 4/02; H04W 72/005; H04W 72/0446; H04B 7/2018
(Continued)

(56) References Cited

U.S. PATENT DOCUMENTS 5,774,829 A    6/1998   Cisneros
5,999,124 A   12/1999   Sheynblat
(Continued)

FOREIGN PATENT DOCUMENTS

JP    2004-208274 A    7/2004
JP    2006-112936 A    4/2006
(Continued)

OTHER PUBLICATIONS

Information about Related Patents and Patent Applications, see the section attached hereto entitled Related Patents and Patent Applications for further information.
(Continued)

*Primary Examiner* — Harry Liu

(57) ABSTRACT

Systems and methods are described for determining position of a receiver. The positioning system comprises a transmitter network including transmitters that broadcast positioning signals. The positioning system comprises a remote receiver that acquires and tracks the positioning signals and/or satellite signals. The satellite signals are signals of a satellite-based positioning system. A first mode of the remote receiver uses terminal-based positioning in which the remote receiver computes a position using the positioning signals and/or the satellite signals. The positioning system comprises a server coupled to the remote receiver. A second operating mode of the remote receiver comprises network-based positioning in which the server computes a position of the remote receiver from the positioning signals and/or satellite signals, where the remote receiver receives and transfers to the server the positioning signals and/or satellite signals.

35 Claims, 39 Drawing Sheets

Related U.S. Application Data continuation of application No. 12/557,479, filed on Sep. 10, 2009, now Pat. No. 8,130,141, application No. 14/138,412, filed on Dec. 23, 2013, which is a continuation of application No. 13/412,508, filed on Mar. 5, 2012, now Pat. No. 8,643,540, which is a continuation of application No. 12/557,479, application No. 14/138,412, filed on Dec. 23, 2013, which is a continuation of application No. 14/067,911, filed on Oct. 30, 2013, which is a continuation of application No. 13/412,508, and a continuation of application No. 13/412,487.

(60) Provisional application No. 61/095,856, filed on Sep. 10, 2008, provisional application No. 61/163,020, filed on Mar. 24, 2009.

(51) Int. Cl.

| | | |
|---|---|---|
| G01S 19/11 | (2010.01) | |
| G01S 19/46 | (2010.01) | |
| G01S 5/10 | (2006.01) | |
| G01S 19/24 | (2010.01) | |
| G01S 19/42 | (2010.01) | |
| H04B 7/26 | (2006.01) | |
| H04W 72/00 | (2009.01) | |
| H04W 72/04 | (2009.01) | |

(52) U.S. Cl.
CPC ............... *G01S 19/24* (2013.01); *G01S 19/42* (2013.01); *G01S 19/46* (2013.01); *H04B 7/2618* (2013.01); *H04W 72/005* (2013.01); *H04W 72/0446* (2013.01)

(58) Field of Classification Search
USPC ........................................................ 342/386
See application file for complete search history.

(56) References Cited

U.S. PATENT DOCUMENTS

| | | | |
|---|---|---|---|
| 8,130,141 B2 | 3/2012 | Pattabiraman et al. | |
| 8,629,803 B2 | 1/2014 | Raghupathy et al. | |
| 8,643,540 B2 | 2/2014 | Raghupathy et al. | |
| 2003/0114170 A1* | 6/2003 | Rick .................... | G01S 5/0257 455/456.1 |
| 2003/0125045 A1* | 7/2003 | Riley ................... | G01S 5/0205 455/456.1 |
| 2006/0022870 A1 | 2/2006 | Zimmerman | |
| 2007/0013584 A1 | 1/2007 | Camp | |
| 2008/0180316 A1 | 7/2008 | Pande et al. | |
| 2010/0073229 A1 | 3/2010 | Pattabiraman et al. | |
| 2012/0182180 A1 | 7/2012 | Wolf et al. | |
| 2013/0057434 A1 | 3/2013 | Krasner et al. | |
| 2013/0057436 A1 | 3/2013 | Krasner et al. | |
| 2013/0063301 A1 | 3/2013 | Pattabiraman et al. | |
| 2013/0063302 A1 | 3/2013 | Krasner et al. | |
| 2013/0063307 A1 | 3/2013 | Krasner et al. | |
| 2013/0063308 A1 | 3/2013 | Krasner et al. | |
| 2013/0120188 A1 | 5/2013 | Pattabiraman et al. | |
| 2013/0169484 A1 | 7/2013 | Raghupathy et al. | |
| 2014/0055300 A1 | 2/2014 | Raghupathy | |
| 2014/0292580 A1 | 10/2014 | Raghupathy | |

FOREIGN PATENT DOCUMENTS

| | | | |
|---|---|---|---|
| JP | 2006/112936 A | 4/2006 | |
| JP | 2007-29850 A | 11/2007 | |
| JP | 2007-298503 A | 11/2007 | |
| KR | 20070011049 A * | 1/2007 | .......... G01S 5/0215 |
| WO | 9948233 A1 | 9/1999 | |
| WO | 02063865 A2 | 8/2002 | |
| WO | 03/041388 A2 | 5/2003 | |
| WO | 03/079045 A2 | 9/2003 | |
| WO | 2006127617 A2 | 11/2006 | |
| WO | 2008034728 A1 | 3/2008 | |
| WO | 2008034728 A2 | 3/2008 | |

OTHER PUBLICATIONS

Supplementary European Search Report (6 pages).
U.S. Appl. No. 14/138,412, filed Dec. 23, 2013, Raghupathy.
Chinese Patent Office, Office Acton for Chinese Patent Application. No. 201410301460.8, 7 pages (dated Mar. 3, 2016).
U.S. Appl. No. 14/721,936, filed May 25, 2015.
U.S. Appl. No. 14/067,911, filed Oct. 30, 2013.
U.S. Appl. No. 14/138,412, filed Dec. 23, 2013.
U.S. Appl. No. 14/029,682, filed Sep. 17, 2013.
U.S. Appl. No. 14/011,277, filed Aug. 27, 2013.
Applicant, Response to Office Acton for Japanese Patent Application. No. 2014-202928, 6 pages (dated Dec. 25, 2015).
Japanese Patent Office, Office Acton for Japanese Patent Application. No. 2014-202928, 6 pages (dated Aug. 26, 2015).
Japanese Office Action (native language).
Chinese Office Action (native language).
Chinese Patent Office, Office Acton for Chinese Patent Application. No. 201410301456.1, 5 pages (dated Jan. 6, 2016).
See 'Related Patents and Patent Applications' attached hereto.
Australian Examination Report dated Jun. 4, 2014.
Response to Australian Examination Report dated Jun. 30, 2014.
Australian Examination Report dated Oct. 7, 2014.
European Search Report dated Sep. 9, 2014.
Response to European Search Report dated Mar. 10, 2015.
Japanese Office Action dated Dec. 11, 2012 (native language).
Response to Japanese Office Action dated Apr. 12, 2013 (native language).
Japanese Office Action dated Jan. 8, 2014 (native language).
Response to Japanese Office Action dated Mar. 27, 2014 (native language).
Japanese Notice of Allowance dated Sep. 12, 2014 (native language).
Response to Examiner's Report for Australian Patent Application No. 2009291759, 14 pages (dated Jun. 4, 2015).
Examiner's Report for Australian Patent Application No. 2009291759, 3 pages (dated Oct. 7, 2014).
European Patent Office, Examination Report for European Patent Application. No. 09813636.9, 6 pages (dated Apr. 8, 2016).
Canadian Patent Office, Office Action for Canadian Patent Application. No. 2736768, 4 pages (dated Apr. 21, 2016).
Applicant, Response to Office Action for Chinese Patent Application. No. 201410301456.1, 22 pages (dated Jul. 20, 2016).
Japanese Patent Office, Office Action for Japanese Patent Application. No. JP 2014-202928, 3 pages (dated Jun. 7, 2016).
European Patent Office, Search Report for European Patent Application. No. 16168357.8, 5 pages (dated Sep. 16, 2016).
Korean Patent Office, Office Action for Korean Patent Application. No. 10-2016-7014311, 4 pages (dated Aug. 19, 2016).
Applicant, Response to Search Report for European Patent Application. No. 09813636.9, 19 pages (dated Aug. 5, 2016).
Applicant, Response to Office Action for Canadian Patent Application. No. 2736768, 79 pages (dated Oct. 17, 2016).
Applicant, Response to Office Action for Japanese Patent Application. No. 2014-202928, 7 pages (dated Sep. 28, 2016).

* cited by examiner

WIDE AREA POSITIONING SYSTEM

RELATED APPLICATIONS

This application is a Continuation of U.S. patent application Ser. No. 14/067,911, filed Oct. 30, 2013, entitled WAPS AREA POSITIONING SYSTEM, the content of which is hereby incorporated by reference herein in its entirety for all purposes. This application is a Continuation of U.S. patent application Ser. No. 13/412,487, filed Mar. 5, 2012, entitled WAPS AREA POSITIONING SYSTEM, the content of which is hereby incorporated by reference herein in its entirety for all purposes. This application is a Continuation of U.S. patent application Ser. No. 13/412,508, filed Mar. 5, 2012, entitled WAPS AREA POSITIONING SYSTEM, the content of which is hereby incorporated by reference herein in its entirety for all purposes. Both of these pending applications are Continuations of U.S. Pat. No. 8,130,141, issued Mar. 6, 2012, entitled WAPS AREA POSITIONING SYSTEM.

TECHNICAL FIELD

The disclosure herein relates generally to positioning systems. In particular, this disclosure relates to a wide area positioning system.

BACKGROUND

Positioning systems like Global Positioning System (GPS) have been in use for many years. In poor signal conditions, however, these conventional positioning system can have degraded performance.

DETAILED DESCRIPTION

Systems and methods are described for determining position of a receiver. The positioning system of an embodiment comprises a transmitter network including transmitters that broadcast positioning signals. The positioning system comprises a remote receiver that acquires and tracks the positioning signals and/or satellite signals. The satellite signals are signals of a satellite-based positioning system. A first mode of the remote receiver uses terminal-based positioning in which the remote receiver computes a position using the positioning signals and/or the satellite signals. The positioning system comprises a server coupled to the remote receiver. A second operating mode of the remote receiver comprises network-based positioning in which the server computes a position of the remote receiver from the positioning signals and/or satellite signals, where the remote receiver receives and transfers to the server the positioning signals and/or satellite signals.

A method of determining position of an embodiment comprises receiving at a remote receiver at least one of positioning signals and satellite signals. The positioning signals are received from a transmitter network comprising a plurality of transmitters. The satellite signals are received from a satellite-based positioning system. The method comprises determining a position of the remote receiver using one of terminal-based positioning and network based positioning. The terminal-based positioning comprises computing a position of the remote receiver at the remote receiver using at least one of the positioning signals and the satellite signals. The network-based positioning comprises computing a position of the remote receiver at a remote server using at least one of the positioning signals and the satellite signals.

In the following description, numerous specific details are introduced to provide a thorough understanding of, and enabling description for, the systems and methods described. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

Figure 1:
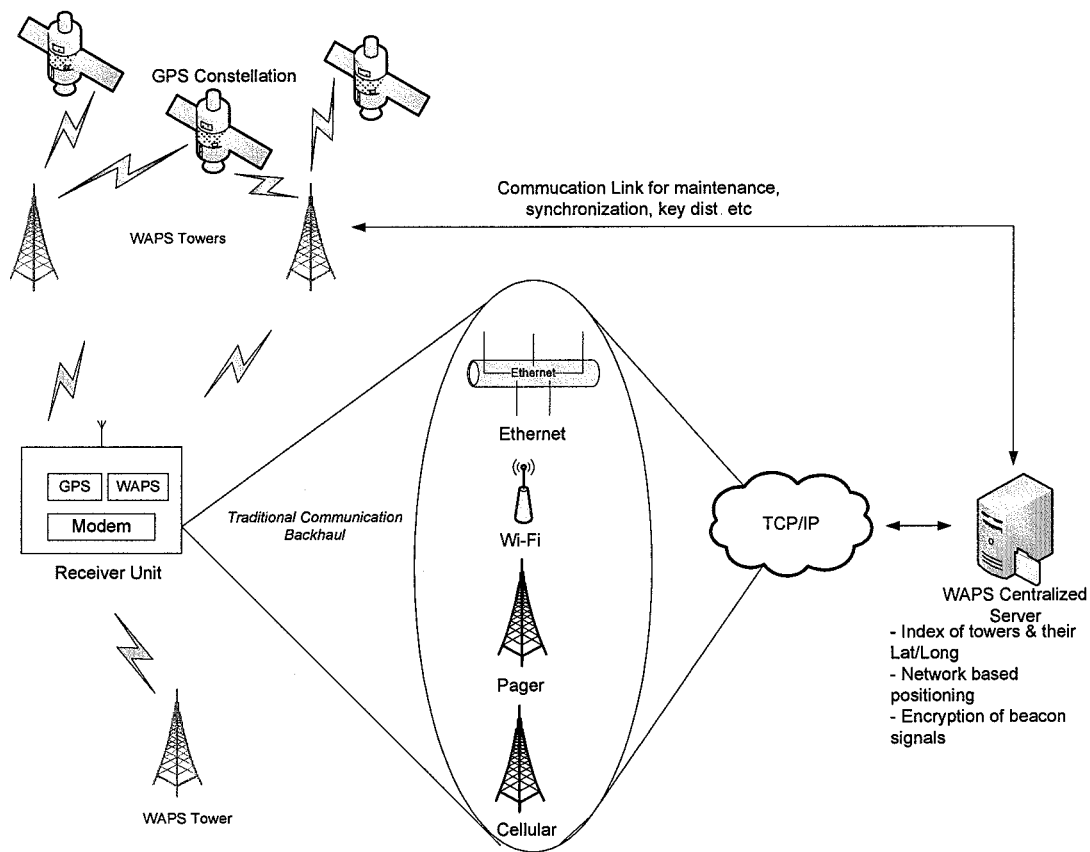
FIG. 1 shows a wide area positioning system in an embodiment.

FIG. 1 shows a positioning system in an embodiment. The positioning system, also referred to herein as the wide area positioning system (WAPS), or "system", includes a network of synchronized beacons, receiver units that acquire and track the beacons and/or Global Positioning System (GPS) satellites (and optionally have a location computation engine), and a server that comprises an index of the towers, a billing interface, a proprietary encryption algorithm (and optionally a location computation engine). The system operates in the licensed/unlicensed bands of operation and transmits a proprietary waveform for the purposes of location and navigation purposes. The WAPS system can be used in conjunction with other positioning systems for better location solution or the WAPS system can be used to aid other positioning systems. In the context of this document, a positioning system is one that localizes one or more of latitude, longitude and altitude coordinates.

In this document, whenever the 'GPS' is referred to, it is done so in the broader sense of GNSS (Global Navigation Satellite System) which may include other existing satellite positioning systems such as Glonass as well as future positioning systems such as Galileo and CompassBeidou.

Figure 2:
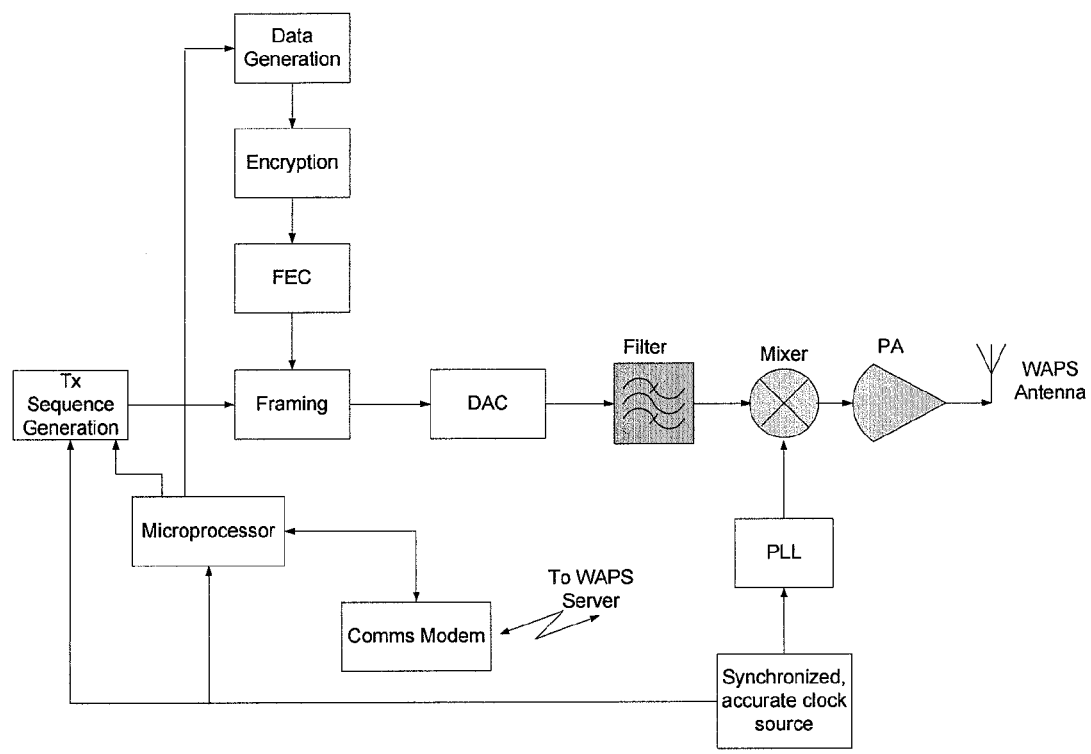
FIG. 2 shows a synchronized beacon in an embodiment.

FIG. 2 shows a synchronized beacon in an embodiment. The synchronized beacons of an embodiment, also referred to herein as beacons, form a CDMA network, and each beacon transmits a Pseudo Random Number (PRN) sequence with good cross-correlation properties such as a Gold Code sequence with a data stream of embedded assistance data. Alternatively, the sequences from each beacon transmitter can be staggered in time into separate slots in a TDMA format.

In a terrestrial positioning system, one of the main challenges to overcome is the near-far problem wherein, at the receiver, a far-away transmitter will get jammed by a nearby transmitter. To address this issue, beacons of an embodiment use a combination of CDMA and TDMA techniques in which local transmitters can use separate slots (TDMA) (and optionally different codes (CDMA)) to alleviate the near-far problem. Transmitters further afield would be allowed to use the same TDMA slots while using different CDMA codes. This allows wide-area scalability of the system. The TDMA slotting can be deterministic for guaranteed near-far performance or randomized to provide good average near-far performance. The carrier signal can also be offset by some number of hertz (for example, a fraction of the Gold code repeat frequency) to improve cross-correlation performance of the codes to address any 'near-far' issues. When two towers use the same TDMA slot but different codes, the cross-correlation in the receiver can be further rejected by using interference cancellation of the stronger signal before detecting the weaker signal.

Another important parameter in the TDMA system is the TDMA slotting period (also called a TDMA frame). Specifically, in the WAPS system, the TDMA frame duration is time period between two consecutive slots of the same transmitter. The TDMA frame duration is determined by the product of the number of transmitter slots required for positioning in the coverage area and the TDMA slot duration. The TDMA slot duration is determined by the sensitivity requirements, though sensitivity is not necessarily limited by a single TDMA slot. One example configuration may use 1 second as the TDMA frame duration and 100 ms as the TDMA slot duration.

Additionally, the beacons of an embodiment can use a preamble including assistance data or information can be used for channel estimation and Forward Error Detection and/or Correction to help make the data robust. The assistance data of an embodiment includes, but is not limited to, one or more of the following: precise system time at either the rising or falling edge of a pulse of the waveform; Geocode data (Latitude, Longitude and Altitude) of the towers; geocode information about adjacent towers and index of the sequence used by various transmitters in the area; clock timing corrections for the transmitter (optional) and neighboring transmitters; local atmospheric corrections (optional); relationship of WAPS timing to GNSS time (optional); indication of urban, semi-urban, rural environment to aid the receiver in pseudorange resolution (optional); and, offset from base index of the PN sequence or the index to the Gold code sequence. In the transmit data frame that is broadcast, a field may be included that includes information to disable a single or a set of receivers for safety and/or license management reasons.

The transmit waveform timing of the transmissions from the different beacons and towers of an embodiment are synchronized to a common timing reference. Alternatively, the timing difference between the transmissions from different towers should be known and transmitted. The assistance data is repeated at an interval determined by the number and size of the data blocks, with the exception of the timing message which will be incremented at regular intervals. The assistance data maybe encrypted using a proprietary encryption algorithm, as described in detail herein. The spreading code may also be encrypted for additional security. The signal is up-converted and broadcast at the pre-defined frequency. The end-to-end delay in the transmitter is accurately calibrated to ensure that the differential delay between the beacons is less than approximately 3 nanoseconds. Using a differential WAPS receiver at a surveyed location listening to a set of transmitters, relative clock corrections for transmitters in that set can be found.

The tower arrangement of an embodiment is optimized for coverage and location accuracy. The deployment of the towers will be arranged in such a way as to receive signals from 3 or more towers in most of the locations within the network and at the edge of the network, such that the geometric dilution of precision (GDOP) in each of these locations is less than a predetermined threshold based on the accuracy requirement. Software programs that do RF planning studies will be augmented to include the analysis for GDOP in and around the network. GDOP is a function of receiver position and transmitter positions. One method of incorporating the GDOP in the network planning is to set up an optimization as follows. Function to be minimized is volume integral of the square of GDOP over the coverage volume. The volume integration is with respect to the (x, y, z) coordinates of the receiver position. The minimization is with respect to the n transmitter position coordinates $(x_1,y_1,z_1), (x_2,y_2,z_2), \ldots (x_n,y_n,z_n)$ in a given coverage area subject to the constraints that they are in the coverage volume: $x_{min} < x < x_{max}, y_{min} < y < y_{max}, z_{min} < z < z_{max}$ for $i=1, \ldots, n$ with $x_{min}, y_{min}$ and $z_{min}$ being the lower limits and with $x_{max}, y_{max}$ and $z_{max}$ being the upper limits of the coverage volume. The function to be minimized can be written as $$f(x_i, y_i, z_i; i = 1, 2, \ldots n) = \iiint_{x \in (xl,xu), y \in (yl,yu), z \in (zl,zu)} GDOP^2(x, y, z, x_i, y_i, z_i; i = 1, 2, \ldots n)$$

Additionally, the function to be minimized may be weighted according to the importance (i.e. performance quality required) of the coverage region $R_j$.

$$f(x_i, y_i, z_i; i = 1, 2, \ldots n) = \sum_j W_j \iiint_{x,y,z \in R_j} GDOP^2(x, y, z, x_i, y_i, z_i; i = 1, 2, \ldots n)$$

An additional constraint on the tower coordinate locations can be based on location of already available towers in the given area. The coordinatization of all coordinates can typically be done in local level coordinate system with average east as positive x, average north as positive y and average vertical up as positive z. The software which solves the above constrained minimization problem will output optimized transmitter positions $(x_1,y_1,z_1), (x_2,y_2,z_2), \ldots (x_n,y_n,z_n)$ that would minimize the function $f$.

$$\arg\min_{x_i, y_i, z_i; i=1,2,\ldots n} (f(x_i, y_i, z_i; i = 1, 2, \ldots n))$$

This technique can be applied for both wide area networks (like in a city) or in a local deployment (like in a mall). In one example configuration, the network of transmitters is separated by a distance of approximately 30 km in a triangular/hexagonal arrangement around each metropolitan area. Each tower can radiate via a corresponding antenna up to a maximum power in a range of approximately 20 W to 1 kW EIRP. In another embodiment, the towers can be localized and can transmit at power levels as low as 1 W. The frequency bands of operation include any licensed or unlicensed band in the radio spectrum. The transmit antenna of an embodiment includes an omni-directional antenna, or multiple antennas/arrays that can help with diversity, sectoring etc.

Adjacent towers are differentiated by using different sequences with good cross-correlation properties to transmit or alternatively to transmit the same sequences at different times. These differentiation techniques can be combined and applied to only a given geographical area. For instance the same sequences could be reused over the networks in a different geographical area.

Local towers can be placed in a given geographical area to augment the wide area network towers of an embodiment. The local towers, when used, can improve the accuracy of the positioning. The local towers may be deployed in a campus like environment or, for public safety needs, separated by a distance in a range of few 10 s of meters up to a few kilometers.

The towers will preferably be placed on a diversity of heights (rather than on similar heights) to facilitate a better quality altitude estimate from the position solution. In addition to transmitters at different latitude/longitude having different heights, another method to add height diversity to the towers is to have multiple WAPS transmitters (using different code sequences) on the same physical tower (with identical latitude and longitude) at different heights. Note that the different code sequences on the same physical tower can use the same slots, because transmitters on the same tower do not cause a near-far problem.

WAPS transmitters can be placed on pre-existing or new towers used for one or more other systems (such as cellular towers). WAPS transmitter deployment costs can be minimized by sharing the same physical tower or location.

In order to improve performance in a localized area (such as, for example, a warehouse or mall), additional towers can be placed in that area to augment the transmitters used for wide area coverage. Alternatively, to lower costs of installing full transmitters, repeaters can be placed in the area of interest.

Note that the transmit beacon signals used for positioning discussed above need not be transmitters built exclusively for WAPS, but can be signals from any other system which are originally synchronized in time or systems for which synchronization is augmented through additional timing modules. Alternately, the signals can be from systems whose relative synchronization can be determined through a reference receiver. These systems can be, for example, already deployed or newly deployed with additional synchronization capability. Examples of such systems can be broadcast systems such as digital and analog TV or MediaFlo.

Figure 3:
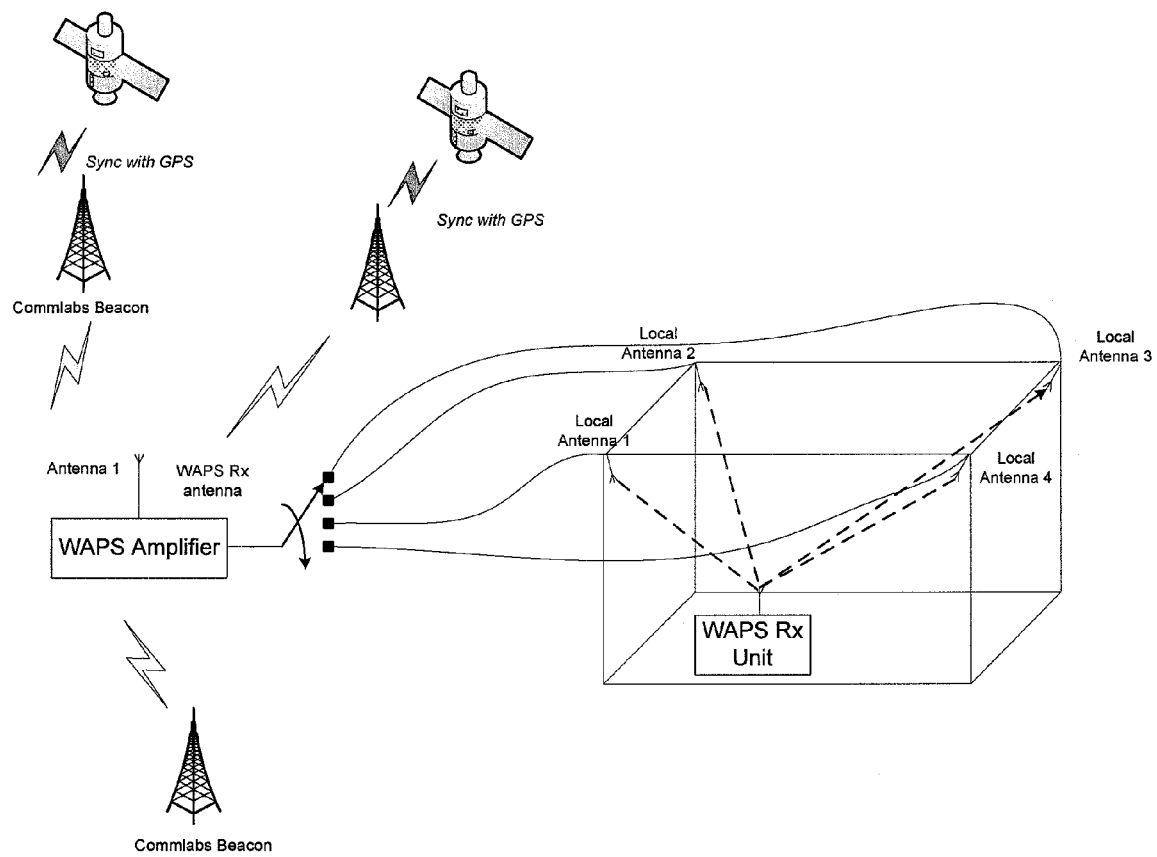
FIG. 3 shows a positioning system using a repeater configuration in an embodiment.

FIG. 3 shows a positioning system using a repeater configuration in an embodiment. The repeater configuration comprises the following components:

1) A common WAPS receive antenna (Antenna 1)
2) An RF power amplifier and a splitter/switch connects to various WAPS transmitter antennas (Local Antennas 1-4).
3) WAPS User Receiver Antenna1 receives, amplifies and distributes (switches) the composite signal to Local Antennas 1-4. The switching should be done (preferably) in a manner such that there is no overlap (collision) of transmissions from different repeaters at the user receiver. Collision of transmissions can be avoided through the use of guard intervals. The known cable delays from the switch to the transmit antenna should be compensated either by adding delays at the repeater-amplifier-transmitter to equalize the overall delay for all local repeaters or by adjusting the estimated time of arrival from a particular repeater by the cable delay at the user-receiver. When TDMA is used in the wide area WAPS network, the repeater slot switching rate is chosen such that each wide area slot (each slot will contain one wide area WAPS tower) occurs in all repeater slots. One example configuration would use the repeater slot duration equal to a multiple of the wide area TDMA frame duration. Specifically, if the wide area TDMA frame is 1 second, then the repeater slots can be integer seconds. This configuration is the simplest, but is suitable only for deployment in a small, limited area because of requirement of RF signal distribution on cables. The user WAPS receiver uses time-difference of arrival when listening to repeater towers to compute position and works under a static (or quasi static) assumption during the repeater slotting period. The fact that the transmission is from a repeater can be detected automatically by the fact that each WAPS tower signal shows the same timing difference (jump) from one repeater slot to the next one.

Figure 4:
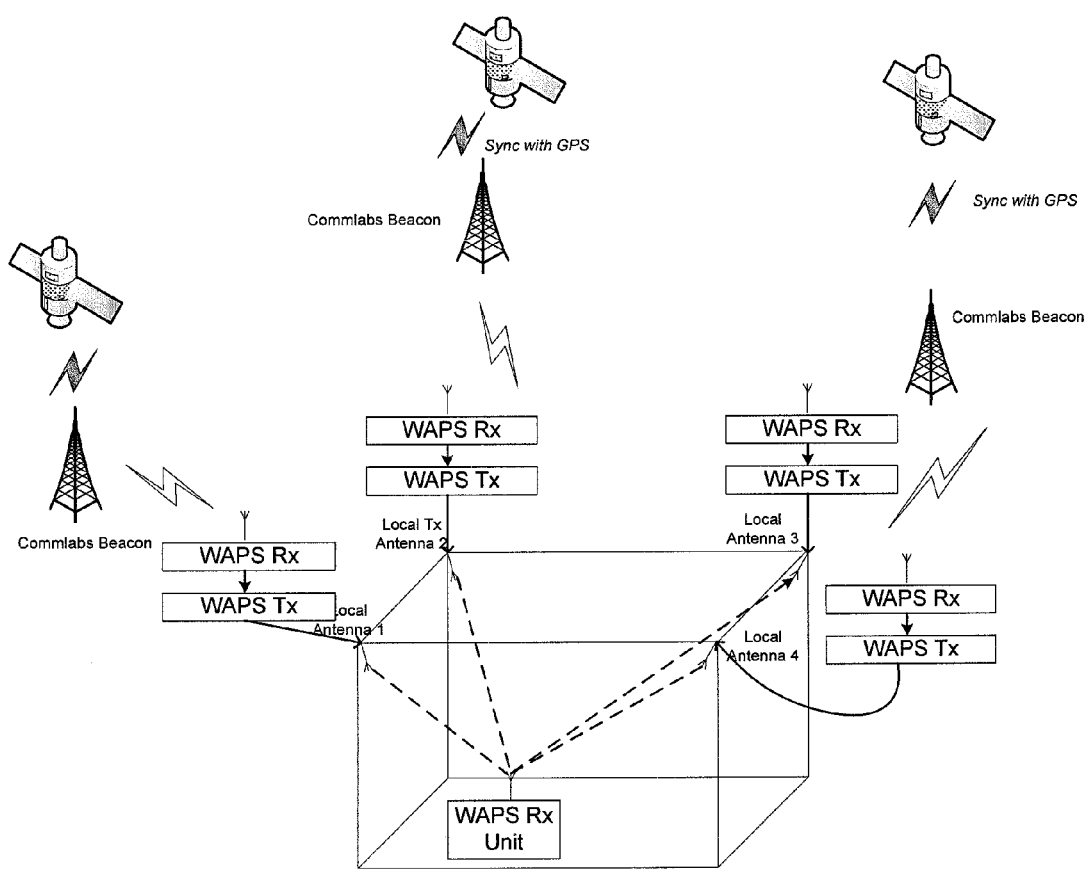
FIG. 4 shows a positioning system using a repeater configuration in an embodiment.

FIG. 4 shows a positioning system using a repeater configuration, under an alternative embodiment. In this configuration each repeater comprises a WAPS repeater-receiver and an associated coverage-augmentation WAPS transmitter with local antenna (which can be indoors, for example). The WAPS repeater receiver should be able to extract WAPS system timing information as well as WAPS data stream corresponding to one wide area WAPS transmitter. The WAPS system timing and data corresponding to one wide area WAPS transmitter are passed to the corresponding local area WAPS transmitters which can then re-transmit the WAPS signal (for example, using a different code and the same slot). The transmitter will include additional data in its transmission such as latitude, longitude and altitude of the local antenna. In this configuration, the WAPS user receiver operation (range measurement and position measurement) can be transparent to the fact that the signals are coming from repeaters. Note that the transmitter used in the repeater is cheaper than a full WAPS beacon in that it does not need to have a GNSS timing unit to extract GNSS timing.

Depending on the mode of operation of the receiver unit, either terminal-based positioning or network-based positioning is provided by the system. In terminal based positioning, the receiver unit computes the position of the user on the receiver itself. This is useful in applications like turn-by-turn directions, geo-fencing etc. In network based positioning, the receiver unit receives the signals from the towers and communicates or transmits the received signal to a server to compute the location of the user. This is useful in applications like E911, and asset tracking and management by a centralized server. Position computation in the server can be done in near real time or post-processed with data from many sources (e.g., GNSS, differential WAPS etc.) to improve accuracy at the server. The WAPS receiver can also provide and obtain information from a server (similar, for example, to a SUPL Secure User Plane server) to facilitate network based positioning.

Figure 5:
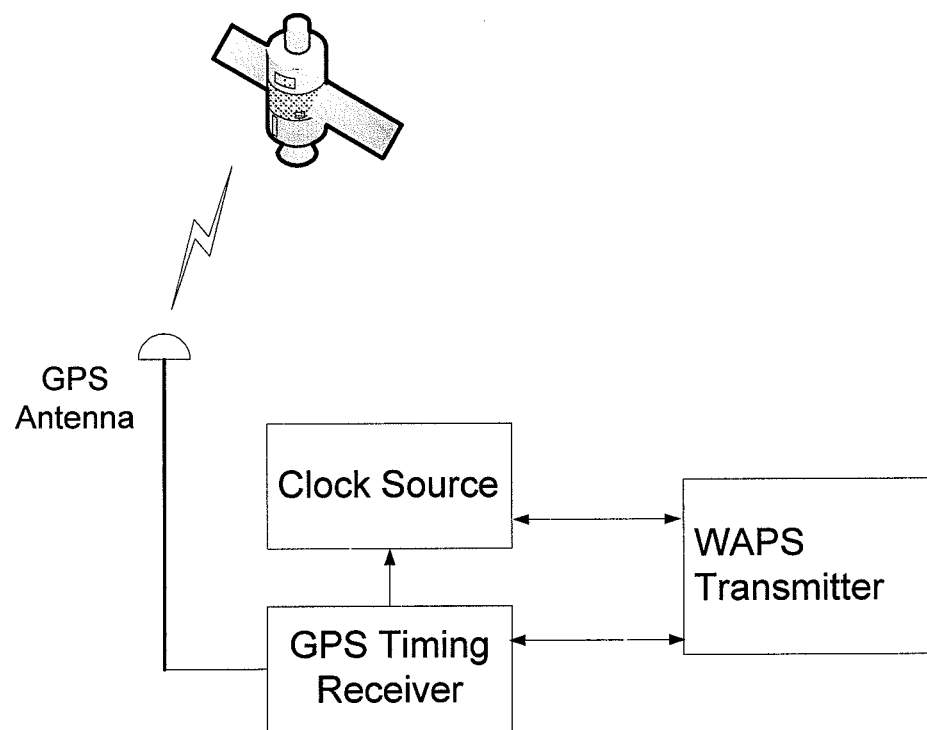
FIG. 5 shows tower synchronization in an embodiment.

The towers of an embodiment maintain synchronization with each other autonomously or using network-based synchronization. FIG. 5 shows tower synchronization in an embodiment. The following parameters are used in describing aspects of synchronization:

System transmitter time=$t_{WAPS\_tx}$

Absolute time reference=$t_{WAPS\_abs}$

Time Adjustment=$\Delta_{system}=t_{WAPS\_tx}-t_{WAPS\_abs}$

Note that it is not essential to synchronize WAPS system time to an absolute time reference. However, all WAPS transmitters are synchronized to a common WAPS system time (i.e. relative timing synchronization of all WAPS transmitter). Timing corrections of each transmitter relative to WAPS system time (if any) should be computed. The timing corrections should be made available to the receivers either directly through over the air WAPS assistance transmission or through some other communication means. The assistance can be delivered, for example, to the WAPS receiver through a cellular (or other) modem or through a broadcast data from a system (such as Iridium or digital TV or MediaFlo or broadcast channels of cellular systems). Alternatively, the timing correction can be sent to the server and used when computing position at the server. A description of tower synchronization of an embodiment follows.

Under network based synchronization, the towers synchronize with each other in a local area. The synchronization between towers generally includes transmission of a pulse (which can be modulated using any form of modulation onto a carrier and/or spread using a spreading code for better time resolution which in turn modulates a carrier) and synchronizing to the pulse edge on the receiver, as described in detail herein.

Figure 6:
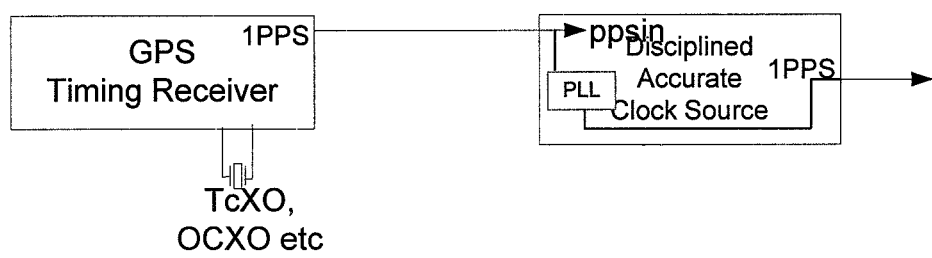
FIG. 6 shows a GPS disciplined PPS generator in an embodiment.
Figure 7:
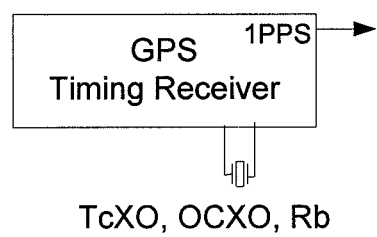
FIG. 7 is a GPS disciplined oscillator in an embodiment.

In the autonomous synchronization mode of an embodiment, the towers are synchronized using a local timing reference. The timing reference can be one of the following, for example: GPS receivers; highly accurate clock sources (e.g., Atomic); a local time source (e.g., GPS disciplined clock); and, any other network of reliable clock sources. Use of signals from XM satellite radio, LORAN, eLORAN, TV signals etc. which are precisely time synchronized can be used as a coarse timing reference for the towers. As an example in one embodiment, FIG. 6 shows a PPS pulse source from a GPS receiver being used to discipline an accurate/stable timing source such as a Rubidium, Caesium or a hydrogen master in an embodiment. Alternatively, a GPS disciplined Rubidium clock oscillator can be used, as shown in FIG. 7.

With reference to FIG. 6, the time constant of the PLL in the accurate clock source is set to a large enough number (e.g., in the range of 0.5-2 hours) which provides for better short term stability (or equivalently, filtering of the short term GPS PPS variations) and the GPS-PPS provides for longer term stability and wider area 'coarse' synchronization. The transmitter system continuously monitors these two PPS pulses (from the GPS unit and from the accurate clock source) and reports any anomaly. The anomalies could be that after the two PPS sources being in lock for several hours, one of the PPS sources drifts away from the other source by a given time-threshold determined by the tower network administrator. A third local clock source can be used to detect anomalies. In case of anomalous behavior, the PPS signal which exhibits the correct behavior is chosen by the transmitter system and reported back to the monitoring station. In addition, the instantaneous time difference between the PPS input and PPS output of the accurate time source (as reported by the time source) can either be broadcast by the transmitter or can be sent to the server to be used when post processing.

Figure 8:
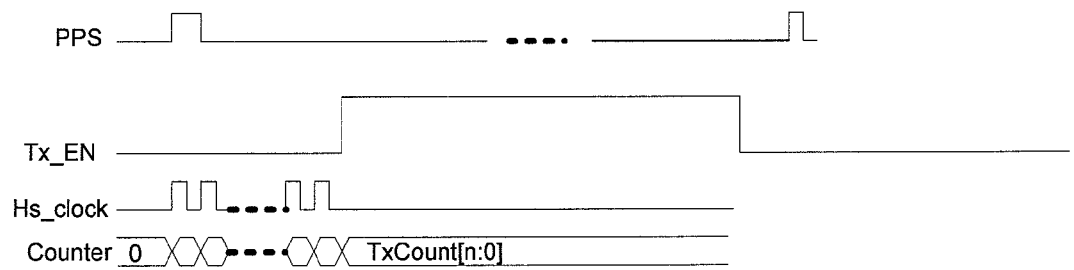
FIG. 8 shows a signal for counting the time difference between the PPS and the signal that enables the analog sections of the transmitter to transmit the data in an embodiment.

In the transmitter system, the time difference between the rising edge of the PPS pulse input and the rising edge of the signal that enables the analog sections of the transmitter to transmit the data is measured using an internally generated high speed clock. FIG. 8 shows a signal diagram for counting the time difference between the PPS and the signal that enables the analog sections of the transmitter to transmit the data in an embodiment. The count that signifies that difference is sent to each of the receivers as a part of the data stream. Use of a highly stable clock reference such as a Rubidium clock (the clock is stable over hours/days) allows the system to store/transmit this correction per tower on the device, just in case the device cannot modulate the specific tower data anymore. This correction data can also be sent via the communication medium to the device, if there is one available. The correction data from the towers can be monitored by either reference receivers or receivers mounted on the towers that listen to other tower broadcasts and can be conveyed to a centralized server. Towers can also periodically send this count information to a centralized server which can then disseminate this information to the devices in the vicinity of those towers through a communication link to the devices. Alternatively, the server can pass the information from towers (e.g., in a locale) to neighboring towers so that this information can be broadcast as assistance information for the neighboring towers. The assistance information for neighboring towers may include position (since the towers are static) and timing correction information about towers in the vicinity.

Figure 9:
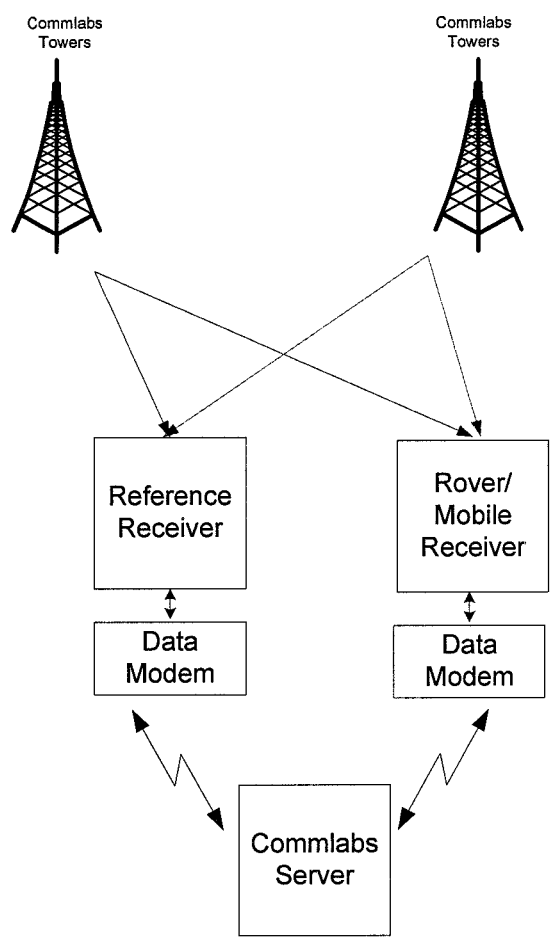
FIG. 9 shows the differential WAPS system in an embodiment.

In another embodiment, a wide area differential positioning system can be used to correct for timing errors from the towers. FIG. 9 shows the differential WAPS system in an embodiment. A reference receiver (located at a pre-surveyed location) is used to receive signals from all the towers in the vicinity. Although the principles of differential GPS are applied in this method, dealing with the effects of non-line-of-sight in the terrestrial case makes it unique. The reference receiver's pseudorange (code phase) measurements for each tower are time-tagged and then sent to the server. The received code phase-based ranges measured at the reference receiver for towers j and i can be written as follows:

$$R_{ref}^j(t) = \rho_{ref}^j + c(dt_{ref} - dt^j) + \epsilon_{R,ref}^j$$

$$R_{ref}^i(t) = \rho_{ref}^i + c(dt_{ref} - dt^i) + \epsilon_{R,ref}^i,$$

where $\rho_{ref}^j$ is the reference receiver to transmit tower j geometric range, $dt_{ref}$ and $dt^j$ are respectively the reference receiver and transmitter clock offsets referred to their respective antennas with respect to a common reference time (say, GPS time), c is the speed of light, and $\epsilon_{R,ref}^j$ is the measurement noise.

The differences in clock timing between the towers i and j, $dt^i - dt^j$ are computed at the server by subtracting the two equations above and using the known geometric ranges from reference receiver to the transmit towers. This allows for elimination of the timing differences between the transmitters in the rover/mobile station measurements. Note that averaging over time can be used to get better (e.g., less noisy) estimates of the time difference $dt^i - dt^j$ when the clocks used in the transmit towers are relatively stable.

The rover/mobile station's pseudorange measurements are also time tagged and sent to a server. The received code phase based ranges measured at the rover/mobile station can be written as:

$$R_m^i(t) = \rho_m^i + c(dt_m - dt^i) + \epsilon_{R,m}^i$$

$$R_m^j(t) = \rho_m^j + c(dt_m - dt^j) + \epsilon_{R,m}^j.$$

By subtracting the two equations above and re-arranging, the result is $$(\rho_m^j - \rho_m^i) = (R_m^j(t) - R_m^i(t)) - c(dt^i - dt^j) + (\epsilon_{R,m}^i - \epsilon_{R,m}^j).$$

Note that $R_m^j(t)$ and $R_m^i(t)$ are measured quantities and the quantity $dt^i - dt^j$ is computed from the reference receiver measurements. Each of $\rho_{ref}^j$ and $\rho_{ref}^j$ can be written in terms of the unknown coordinates of the receiver and the known coordinates of the transmit towers i and j. With three range measurements, two range difference equations can be formed as above to obtain a two-dimensional position solution or with four range measurements, three range difference equations can be formed as above to obtain a three-dimensional position. With additional measurements, a least square solution can be used to minimize the effect of the noise quantities $\epsilon_{R,m}^i$ and $\epsilon_{R,m}^j$.

Alternatively, the timing difference corrections can be sent back to the mobile station to correct for the errors in-situ and to facilitate position computation at the mobile station. The differential correction can be applied for as many transmitters as can be viewed by both the reference and the mobile stations. This method can conceptually allow the system to operate without tower synchronization or alternatively to correct for any residual clock errors in a loosely synchronized system.

Another approach is a standalone timing approach as opposed to the differential approach above. One way of establishing timing synchronization is by having GPS timing receivers at each Transmit tower in a specific area receive DGPS corrections from a DGPS reference receiver in the same area. A DGPS reference receiver installed at a known position considers its own clock as a reference clock and finds corrections to pseudo-range measurements to the GPS satellites it tracks. The DGPS correction for a particular GPS satellite typically comprises total error due to satellite position and clock errors and ionospheric and tropospheric delays. This total error would be the same for any pseudo-range measurement made by other GPS receivers in the neighborhood of the DGPS reference receiver (typically with an area of about 100 Km radius with the DGPS receiver at the center) because line of sight between DGPS reference receiver and GPS satellite does not change much in direction within this neighborhood. Thus, a GPS receiver using DGPS correction transmitted by a DGPS reference receiver for a particular GPS satellite uses the correction to remove this total error from its pseudo-range measurement for that satellite. However in the process it would add the DGPS reference receiver's clock bias with respect to GPS time to its pseudo-range measurement. But, since this clock bias is common for all DGPS pseudo-range corrections, its effect on the timing solutions of different GPS receivers would be a common bias. But this common bias gives no relative timing errors in the timings of different GPS receivers. In particular, if these GPS receivers are timing GPS receivers (at known positions) then all of them get synced to the clock of DGPS reference receiver. When these GPS timing receivers drive different transmitters, the transmissions also get synchronized.

Instead of using corrections from a DGPS reference receiver, similar corrections transmitted by Wide Area Augmentation System (WAAS) satellites can be used by GPS timing receivers to synchronize transmissions of the transmitters which they drive. An advantage of WAAS is that the reference time is not that of the DGPS reference system but it is the GPS time itself as maintained by the set of accurate atomic clocks.

Figure 10:
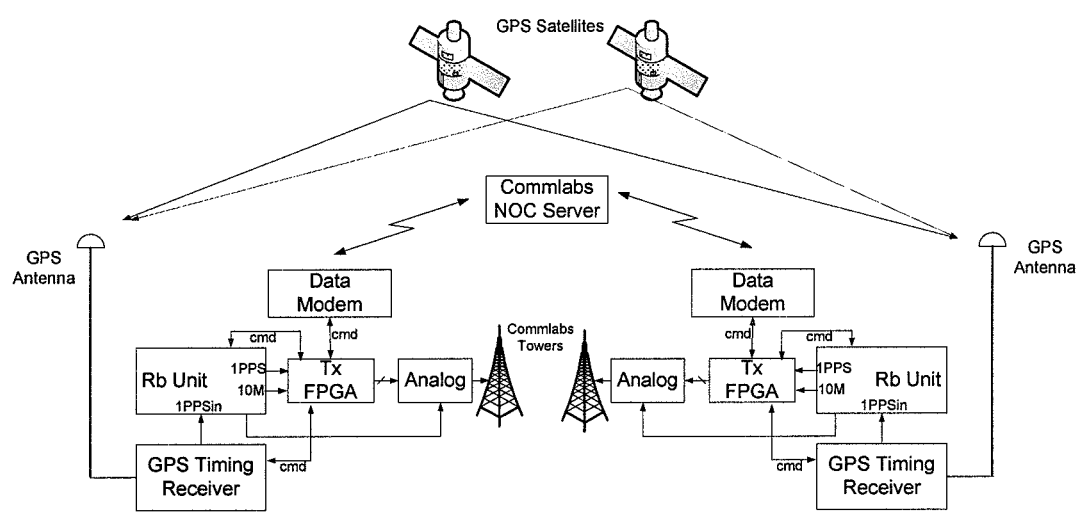
FIG. 10 shows common view time transfer in an embodiment.

Another approach to achieving accurate time synchronization between the towers across a wide area is to use time transfer techniques to establish timing between pairs of towers. One technique that can be applied is referred to as "common view time transfer". FIG. 10 shows common view time transfer in an embodiment. The GPS receivers in the transmitters that have the view of a common satellite are used for this purpose. Code phase and/or carrier phase measurements from each of the towers for the satellites that are in common view are time tagged periodically (e.g., minimum of once every second) by the GPS receivers and sent to a server where these measurements are analyzed.

The GPS code observable $R_p^i$ (signal emitted by satellite "i" and observed by a receiver "p") can be written as:

$$R_p^i(t) = \rho_p^i + c(\delta_R^i + \delta_{R,p} + T_p^i + I_p^i) + c(dt_p - dt^i) + \epsilon_{R,p},$$

where $\rho_p^i$, is the receiver-satellite geometric range equal to $|\vec{X}_p - \vec{X}^i|$, $\vec{X}_p$ is the receiver antenna position at signal reception time, $\vec{X}^i$ represents the satellite position at signal emission time, $I_p^i$ and $T_p^i$ are respectively the ionospheric and tropospheric delays, and $\delta_{R_p}$ and $\delta_R^i$ are the receiver and satellite hardware group delays. The variable $\delta_{R_p}$ includes the effect of the delays within the antenna, the cable connecting it to the receiver, and the receiver itself. Further, $dt_p$ and $dt^i$ are respectively the receiver and satellite clock offsets with respect to GPS time, c is the speed of light, and $\epsilon_R$ is the measurement noise.

The common view time transfer method computes the single difference code observable $R_{pq}^i$, which is the difference between code observables simultaneously measured at two receivers (called "p" and "q") as $$R_{pq}^i = \underbrace{\rho_p^i - \rho_q^i}_{\text{geometrical range difference}} + \underbrace{c(dt_p - dt_q)}_{\text{time difference between clocks}} +$$

$$\underbrace{c(T_p^i - T_q^i) + c(I_p^i - I_q^i)}_{\text{Troposhpere \& Ionosphere delay difference}} + \underbrace{c(\delta_{R,p} - \delta_{R,q})}_{\text{Group delay difference between receivers}} + (\epsilon_{R,p} - \epsilon_{R,q})$$

In calculating the single difference observable, the group delay in the satellite as well as the clock error of the satellite gets cancelled. Also, note that in the above equation the tropospheric and ionospheric perturbations cancel (or, can be modeled, for example in cases where the receiver separation is large). Once the group delay differences between the receivers are calibrated, the desired time difference $c(dt_p - dt_q)$ between the receiver clocks can be found from the equation. The single difference across multiple time and satellite measurements can be combined to further improve the quality of the estimated time difference.

In a similar manner, the single difference carrier phase equation for common view time transfer can be written as:

$$\Phi_{pq}^i = \underbrace{\rho_p^i - \rho_q^i}_{\text{geometrical range difference}} + \underbrace{c(dt_p - dt_q)}_{\text{time difference between clocks}} + \underbrace{c(T_p^i - T_q^i) + c(I_p^i - I_q^i)}_{\text{Troposhpere \& Ionosphere delay difference}} +$$

$$\underbrace{c(\delta_{\phi,p} - \delta_{\phi,q})}_{\text{Group delay difference between receivers}} + \underbrace{\lambda(\phi_p^i - \phi_q^i)}_{\text{initial ambiguity in phase}} + \underbrace{\lambda(N_p^i - N_q^i)}_{\text{integer ambiguity in phase measurement}} + (\epsilon_{\phi,p} - \epsilon_{\phi,q}).$$

Note that since initial phase ambiguity and integer ambiguity are present in the above equation, the phase single difference cannot be used to determine the time transfer directly. A combined use of the code and phase observations allows for advantage to be taken of the absolute information about time difference from the codes and the precise information about the evolution of time difference from the carrier phases. The error variance in the carrier phase single difference is significantly better than the code phase single difference leading to better time transfer tracking.

The resulting errors per tower for a given satellite are either sent back to the tower for correction, applied at the tower, sent to the receivers over the communication link for the additional corrections to be done by the receiver, or sent as a broadcast message along with other timing corrections from the tower. In specific instances, it might be such that the measurements from the towers and the receiver are post-processed on the server for better location accuracy. A single channel GPS timing receiver or a multiple channel timing receiver that produces C/A code measurements and/or carrier phase measurements from L1 and/or L2 or from other satellite systems such as Galileo/Glonass can be used for this purpose of common view time transfer. In multiple channel systems, information from multiple satellites in common view are captured at the same instant by the receivers.

An alternative mechanism in "common view time transfer" is to ensure that different timing GPS receivers in the local area (each feeding to its corresponding transmitter) use only common satellites in their timing pulse derivation (e.g., one pulse per second) but no attempt is made to correct the timing pulses to be aligned to the GPS (or UTC) second. The use of common view satellites ensure that common errors in timing pulses (such as common GPS satellite position and clock errors and ionospheric and tropospheric delay compensation errors) pull the errors in timing pulse by about same magnitude and relative errors in timing pulses are reduced. Since, in positioning, only relative timing errors matter, there is no need for any server-based timing error correction. However, a server can give commands to different GPS receivers on which GPS satellites are to be used in deriving timing pulses.

Figure 11:
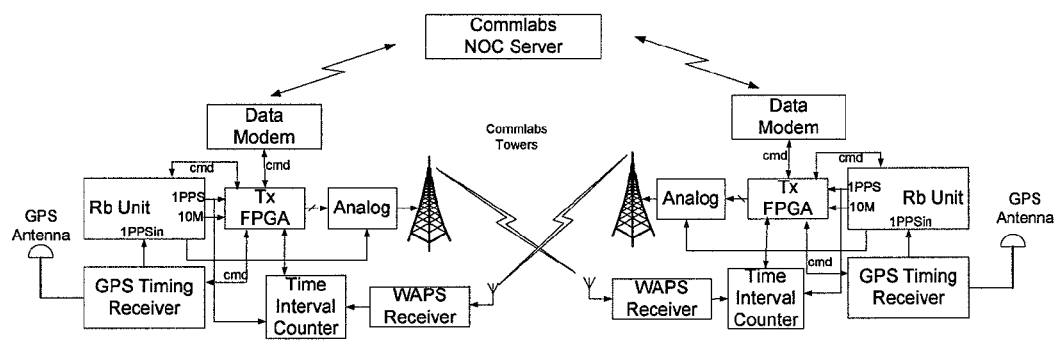
FIG. 11 shows the two-way time transfer in an embodiment.

An alternative method of time transfer is the "two-way time transfer" technique. FIG. 11 shows the two-way time transfer in an embodiment. Consider two towers that are used to time against each other. Transmissions from each of the two transmitters starts on the PPS pulse and a time interval counter is started on the receive section (WAPS Receiver) of the transmit towers. The received signal is used to stop the time interval counter on either side. The results from the time interval counter are sent over the data modem link to the WAPS server where these results along with transmit times are compared and the errors in timing between the two towers can be computed. This can then be extended to any number of towers. In this method, the relationship between the counter measurements $\Delta T_i$ at tower i and $\Delta T_j$ at tower j, and the time difference $dt_{ij}$ between the clock in i and j can be represented as $$dt_{ij} = T_i - T_j = \frac{1}{2}(\Delta T_i - \Delta T_j) + \frac{1}{2}[(\tau_i^{Tx} + \tau_j^{Rx}) - (\tau_j^{Tx} + \tau_i^{Rx})],$$

where $\tau_i^{Tx}$ & $\tau_j^{Tx}$ are the transmitter delays of the towers, and $\tau_i^{Rx}$ & $\tau_j^{Rx}$ are the receiver delays of towers. The time difference can be estimated once the transmitter and receiver delays are calibrated.

In addition to the time transfer between towers, the timing of the towers relative to GPS time can be found by the GPS timing receivers used in common view time transfer. Using the range measurement as $$R_p^i(t) = \rho_p^i + c(\delta_R^i + \delta_{R,p} + T_p^i + I_p^i) + c(dt_p - dt^i) + \epsilon_{R,p},$$

the time correction of local clock relative to GPS time $dt_p$ is computed, after accounting for the delay of the receiver, satellite clock errors and ionospheric/tropospheric errors. The delay of the receiver $\delta_{R,p}$ can be calibrated by measurement of the group delay. Information from the GPS satellite navigation message (either obtained through demodulation or from a server) can be used to compute the satellite timing correction which eliminates the effect of $dt^i$ and $\delta_R^i$. Similarly, troposphere and ionosphere delay effects are minimized using the corrections from an external model. Ionospheric corrections can be obtained for example from WAAS messages. Alternatively, a combination of clock and ionospheric/tropospheric corrections can be obtained from RTCM DGPS corrections for the pseudorange, when available.

The offset relative to GPS time can also be sent as part of the data stream from the towers. This enables any WAPS receiver that acquires the WAPS signal to provide accurate GPS time and frequency aiding to significantly reduce GNSS search requirements in a GNSS receiver.

In an embodiment of the system, the broadcast transmitters can be employed ad hoc to provide localized indoor position determination. For example, in a fire-safety application, the WAPS transmitters would be placed on three or more broadcast stations (could be fire trucks, for example). The towers would synchronize to each other by one of the many means described earlier and broadcast signals. The bandwidth and chipping rates would be scaled based on spectrum availability and accuracy requirements in that area for that application at that time. The receivers would be notified of the system parameters through the communication link to the devices.

Figure 12:
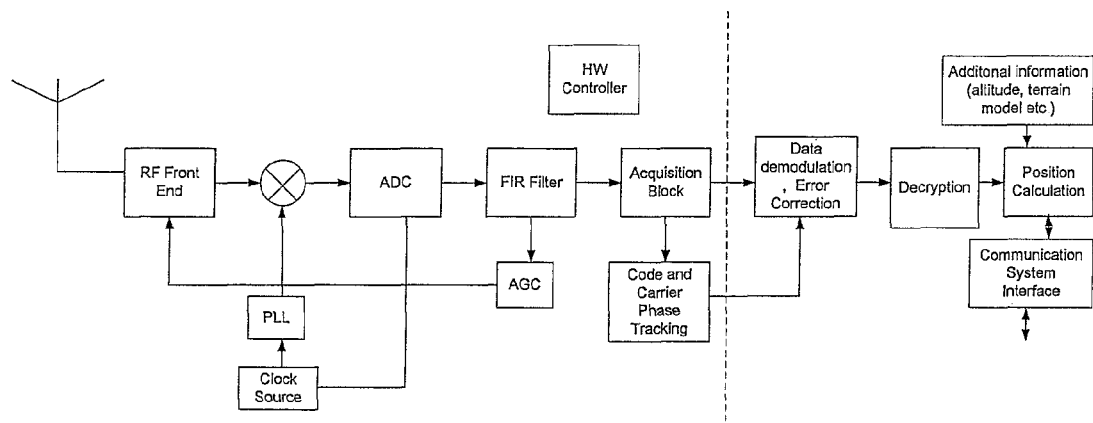
FIG. 12 shows a receiver unit in an embodiment.

FIG. 12 shows a receiver unit in an embodiment. The beacon signal is received at the antenna on the receiver unit, down-converted, demodulated and decrypted and fed to the positioning engine. The receiver provides all information to reconstruct the signal accurately. The receive antenna can be an omni-directional antenna or, alternatively, a number of antennas/arrays providing diversity etc. In another embodiment, the mixing and down conversion can be done in the digital domain. Each receiver unit includes or uses a unique hardware identification number and a computer generated private key. Each receiver unit, in general, stores the last few locations in non volatile memory and can be later queried remotely for the last few stored locations. Based on the availability of the spectrum in a given area, the transmitters and receivers can adapt to the available bandwidth and change the chipping rate and filter bandwidths for better accuracy and multipath resolution.

Figure 13:
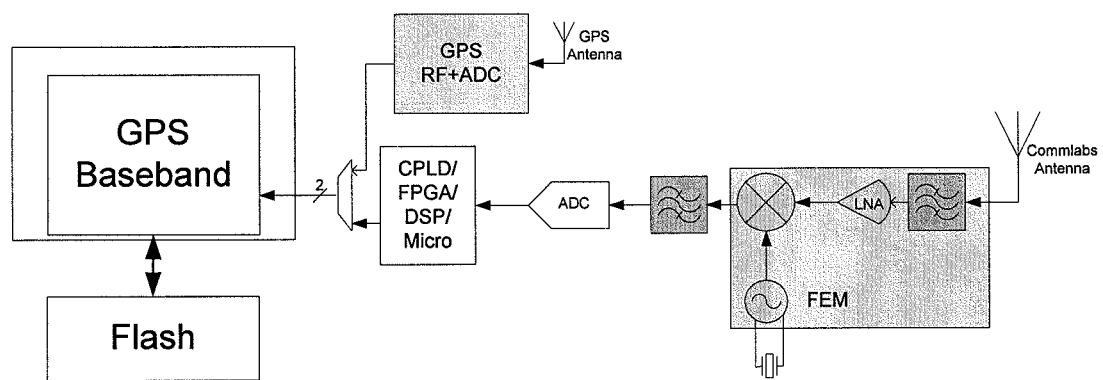
FIG. 13 shows an RF module in an embodiment.

In one embodiment, the digital baseband processing of the received signals is accomplished using commercially-available GPS receivers by multiplexing/feeding the signal from a GPS RF section with the WAPS RF module. FIG. 13 shows the receiver with a WAPS RF module in an embodiment. The RF module includes one or more of Low noise amplifiers (LNAs), filters, down-converter, and analog to digital converters, to name a few. In addition to these components, the signal can be further conditioned to fit the input requirements of the GPS receiver using additional processing on chip or a custom ASIC or on an FPGA or on a DSP or on a microprocessor. The signal conditioning can include digital filtering for in-band or out-of band noise (such as ACI adjacent channel interference), translating intermediate or baseband frequencies of the input to the GPS IC from the frequencies of the WAPS receiver, adjusting the digital signal strength so that the GPS IC will be able to process the WAPS signal, automatic gain control (AGC) algorithms to control the WAPS frontend etc. In particular, the frequency translation is a very useful feature because this allows the WAPS RF module to work with any commercially available GPS receiver. In another embodiment, the entire RF frontend chain including the signal conditioning circuits for the WAPS system can be integrated onto an existing GPS die that contains a GPS RF chain.

Figure 14:
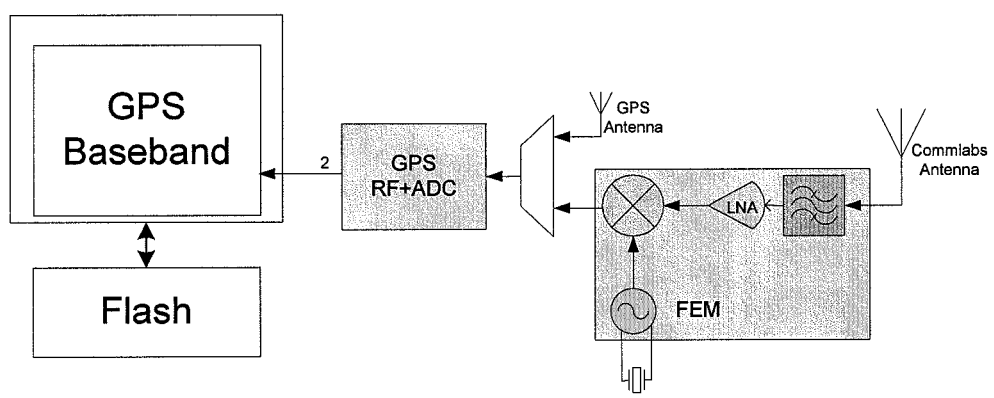
FIG. 14 shows signal upconversion and/or downconversion in an embodiment.

In another embodiment, if access to the digital baseband input is not available, the signal can be up-converted/down-converted from any band to the GPS band and fed into the RF section of the GPS receiver. FIG. 14 shows signal up-conversion and/or down-conversion in an embodiment.

In another embodiment, multiple RF chains or tunable RF chains can be added to both the transmitter and receiver of the WAPS system so as to use the most effective frequency of operation in a given area, be it wide or local. The choice of frequency can be determined by cleanliness of the spectrum, propagation requirements, etc.

The radio front-end can be shared between WAPS and other application. Some parts of the frontend can be shared and some may be used on a mutually exclusive basis. For example, if the die/system already has a TV (NTSC or ATSC or systems like DVB-H, MediaFLO) tuner front-end including the antenna, the TV tuner radio and antenna can be shared with the WAPS system. They can operate on a mutually exclusive basis in that, either the system receives TV signals or receives WAPS signals at any given time. In another embodiment, if it makes it easier to add a WAPS RF section to such a system, the antenna can be shared between the TV tuner and the WAPS system allowing both systems to operate simultaneously. In cases where the system/die has a radio like an FM radio, the RF front-end can be modified to accommodate both the WAPS system and the FM radio and these radios can operate on a mutually exclusive basis. Similar modifications can be done for systems that have some RF frontends that operate in close frequency proximity to the WAPS RF band.

Figure 15:
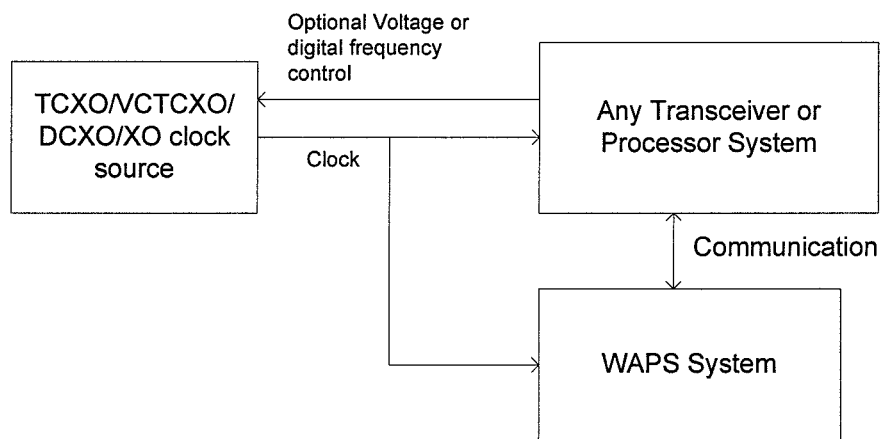
FIG. 15 is a block diagram showing clock sharing in an embodiment.

The clock source reference such as crystal, crystal oscillator (XO), Voltage Controlled Temperature Compensated Crystal Oscillator (VCTCXO), Digitally-controlled Crystal Oscillator (DCXO), Temperature Compensated Crystal Oscillator (TCXO), that is used for a GNSS sub-system can be shared with the WAPS receiver to provide the reference clock to the WAPS receiver. This sharing can be done on the die or off-chip. Alternatively, the TCXO/VCTCXO used by any other system on a cellular phone can shared with the WAPS system. FIG. 15 is a block diagram showing clock sharing in a positioning system in an embodiment. Note that the transceiver or processor system block can refer to a variety of systems. The transceiver system that shares the clock with the WAPS system can be a modem transceiver (for example, a cellular or WLAN or BT modem) or a receiver (for example, a GNSS, FM or DTV receiver). These transceiver systems may optionally control the VCTCXO or DCXO for frequency control. Note that the transceiver system and the WAPS system may be integrated into a single die or may be separate dies and does not impact the clock sharing. The processor can be any CPU system (such as an ARM sub-system, Digital Signal Processor system) that uses a clock source. In general, when a VCTCXO/DCXO is shared, the frequency correction applied by the other system may be slowed down as much as possible to facilitate WAPS operation. Specifically, the frequency updates within the maximum integration times being used in WAPS receiver may be limited to permit better performance (i.e. minimizing SNR loss) for the WAPS receiver. Information regarding the state of the WAPS receiver (specifically, the level of integration being used, acquisition versus tracking state of the WAPS system) can be exchanged with the other system for better coordination of the frequency updates. For example, frequency updates could be suspended during WAPS acquisition phase or frequency updates can be scheduled when the WAPS receiver is in sleep state. The communication could be in the form of control signals or alternatively in the form of messages exchanged between the transceiver system and the WAPS system.

The WAPS broadcasts signals and messages from the towers in such a way that a conventional GPS receiver's baseband hardware need not be modified to support both a WAPS and a traditional GPS system. The significance of this lies in the fact that although the WAPS system has only half the available bandwidth as the GPS C/A code system (which affects the chip rate), the WAPS broadcast signal is configured to operate within the bounds of a commercial grade C/A code GPS receiver. Further, based on signal availability, the algorithms will decide whether GPS signals should be used to determine position or WAPS signals or a combination thereof should be used to get the most accurate location.

The data transmitted on top of the gold codes on the WAPS system can be used to send assistance information for GNSS in the cases of a hybrid GNSS-WAPS usage scenario. The assistance can be in the form of SV orbit parameters (for example, ephemeris and almanac). The assistance may also be specialized to SVs visible in the local area.

In addition, the timing information obtained from the WAPS system can be used as fine time aiding for the GNSS system. Since the WAPS system timing is aligned to GPS (or GNSS) time, aligning to the code and bit of WAPS signal and reading the data stream from any tower provides coarse knowledge of GNSS time. In addition, the position solution (the receiver's clock bias is a by-product of the position solution) determines the WAPS system time accurately. Once the WAPS system time is known, fine time aiding can be provided to the GNSS receiver. The timing information can be transferred using a single hardware signal pulse whose edge is tied to the internal time base of WAPS. Note that the WAPS system time is directly mapped onto GPS time (more generally, with GNSS time, since the time bases of GNSS systems are directly related). The GNSS should be able to latch its internal GNSS time base count upon receipt of this edge. Alternatively, the GNSS system should be able to generate a pulse whose edge is aligned to its internal time base and the WAPS system should be capable of latching its internal WAPS time base. The WAPS receiver then sends a message with this information to the GNSS receiver allowing the GNSS receiver to map its time base to WAPS time base.

Similarly, the frequency estimate for the local clock can be used to provide frequency aiding to the GNSS receiver. Note that frequency estimate from WAPS receiver can be used to refine the frequency estimate of the GNSS receiver whether or not they share a common clock. When the two receivers have a separate clock, an additional calibration hardware or software block is required to measure the clock frequency of one system against the other. The hardware or software block can be in the WAPS Receiver section or in the GNSS receiver section. Then, the frequency estimate from the WAPS receiver can be used to refine the frequency estimate of the GNSS receiver.

Figure 16:
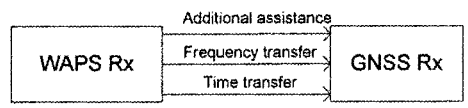
FIG. 16 shows assistance transfer from WAPS to GNSS receiver in an embodiment.

The information that can be sent from the WAPS system to the GNSS system can also include an estimate of location. The estimate of location may be approximate (for example, determined by the PN code of the WAPS tower) or more accurate based on an actual position estimate in the WAPS system. Note that the location estimate available from the WAPS system may be combined with another estimate of position from a different system (for example, a coarse position estimate from cellular ID based positioning) to provide a more accurate estimate of position that can be used to better aid the GNSS system. FIG. 16 shows assistance transfer from WAPS to GNSS receiver in an embodiment.

Figure 17:
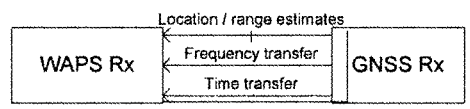
FIG. 17 is a block diagram showing transfer of aiding information from the GNSS receiver to the WAPS receiver in an embodiment.

The GNSS receiver can also help improve the performance of the WAPS receiver in terms of Time-To-First-Fix (TTFF), sensitivity and location quality by providing location, frequency and GNSS time estimates to the WAPS receiver. As an example, FIG. 17 is a block diagram showing transfer of aiding information from the GNSS receiver to the WAPS receiver in an embodiment. Note that the GNSS system can be replaced by LORAN, e-LORAN or similar terrestrial positioning system as well. The location estimate can be partial (eg. Altitude or 2-D position), or complete (eg. 3-D position) or raw range/pseudo-range data). The range/pseudo-range data should be provided along with the location of SV (or means to compute the location of the SV such as SV orbit parameters) to enable usage of this range information in a hybrid solution. All location aiding information should be provided along with a metric indicating its quality. When providing GNSS time information (which may be transferred to the WAPS system using a hardware signal), the offset of GNSS time relative to GPS time (if any) should be provided to enable usage in the WAPS receiver. Frequency estimates, can be provided as an estimate of the clock frequency along with a confidence metric (indicating the estimated quality of the estimate, for example, the maximum expected error in the estimate). This is sufficient when the GNSS and WAPS systems share the same clock source. When the GNSS and WAPS systems use a separate clock, the GNSS clock should also be provided to the WAPS system to enable the WAPS system to calibrate (i.e. estimate the relative clock bias of WAPS with respect to GNSS clock) or, alternatively, the WAPS system should provide its clock to the GNSS system and the GNSS system should provide a calibration estimate (i.e. an estimate the relative clock bias of WAPS with respect to GNSS clock).

Figure 18:
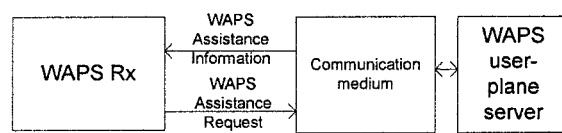
FIG. 18 is an example configuration in which WAPS assistance information is provided from a WAPS server in an embodiment.

To further improve the sensitivity and TTFF of a WAPS receiver, assistance information (such as that would otherwise be decoded from the information transmitted by the towers) can be provided to the WAPS receiver from a WAPS server by other communication media (such as cellular phone, WiFi, SMS etc). With the "almanac" information already available, the WAPS receiver's job becomes simple since the receiver just needs to time align to the transmit waveform (without requirement of bit alignment or decoding). The elimination of the need to decode the data bits reduces TTFF and therefore saves power since the receiver does not need to be continuously powered on to decode all the bits. FIG. 18 is an example configuration in which WAPS assistance information is provided from a WAPS server in an embodiment.

A beacon may be added to the receiver to further improve local positioning. The beacon can include a low power RF transmitter that periodically transmits a waveform with a signature based on a device ID. For example, the signature can be a code that uniquely identifies the transmitter. An associated receiver would be able to find a location of the transmitter with a relatively higher accuracy through either signal energy peak finding as it scans in all directions, or through direction finding (using signals from multiple-antenna elements to determine direction of signal arrival).

Resolution of Multipath Signals

Resolution of multipath is critical in positioning systems. Wireless channel is often characterized by a set of randomly varying multipath components with random phases and amplitudes. For positioning to be accurate, it is imperative that the receiver algorithm resolves the line-of-sight (LOS) path if present (it will be the first arriving path) or the path that arrives first (which may not necessarily be the LOS component).

Traditional methods often work as follows: (1) the received signal is cross-correlated with the transmitted pseudo-random sequence (e.g. Gold code sequence, which is known at the receiver); (2) the receiver locates the first peak of the resulting cross-correlation function and estimates that the timing of the path that arrived first is the same as the timing indicated by the position of this peak. These methods work effectively as long as the lowest multipath separation is much larger than inverse of the bandwidth available which is often not the case. Bandwidth is a precious commodity and a method which can resolve multipath with the minimal amount of bandwidth is highly desired to improve the efficiency of the system.

Depending on the channel environment (including multipath and signal strength), an appropriate method for obtaining an estimate of the earliest arriving path is used. For best resolvability, high-resolution methods are used whereas for reasonable performance at low SNRs more traditional methods that directly use the cross-correlation peak samples and some properties of the correlation function around the peak are applied.

Consider the quantized received signal y[n] sampled at a rate $f_s$ given by:

$$y[n] = h_{\mathit{eff}}[n] \otimes x[n]$$

$$y[n] = \sum_{i=n_0}^{\infty} h_{\mathit{eff}}[i] \cdot x[n-i]$$

where y[n] is the received signal which is the convolution of the transmitted pseudo-random sequence x[n] with the effective channel $h_{\mathit{eff}}[n]=h[n] \otimes h_{tx}[n] \otimes h_{rx}[n]$, where $h_{tx}[n]$ is the transmit filter, $h_{rx}[n]$ is the receive filter and h[n] is the multi-path channel.

One method to find the peak position is by peak interpolation using the values surrounding the apparent peak position. The interpolation may be quadratic using one value on either side of the peak or may use a higher order polynomial using two or more samples around the peak or may use a best fit for the actual pulse shape. In the case of quadratic interpolation, a quadratic is fitted to the peak value and the values immediately surrounding the peak. The peak of the quadratic determines the peak position that is used for ranging. This method is quite robust and can work well at low SNR.

An alternative embodiment may use a value other than the peak position as the reference position. Note that the DLL actually uses the peak position as reference position on the correlation function whereas this method uses a point different from the peak as reference. This method is motivated by the fact that the early edge of the correlation peak is less affected by multi-path than the trailing edge. For example, a point 75% of chip $T_c$ from the peak on the undistorted (without channel effects) correlation function may be used as a reference point. In this case, the portion of the interpolated z[n] function that matches this 75% point is selected and the peak is found as 25% of $T_c$ away from this point.

Another alternative peak correlation function based method may use the peak shape (such as a measure of distortion of the peak, for example, peak width). Starting from the peak location and based on the shape of the peak, a correction to the peak location is determined to estimate the earliest arriving path.

High-resolution methods are a class of efficient multipath-resolution methods which use Eigen-space decompositions to locate the multipath components. Methods such as MUSIC, ESPIRIT fall under this class of resolution schemes. They are highly powerful schemes as in they can resolve effectively much more closely spaced multipath components than traditional methods, for the same given bandwidth. The high resolution earliest time of arrival method attempts to estimate directly the time of arrival of earliest path rather than inferring the peak position from the peak values. The below assumes that a coarse-acquisition of the transmitted signal is already available at the receiver and the start of the pseudo-random sequence is known roughly at the receiver.

Figure 19:
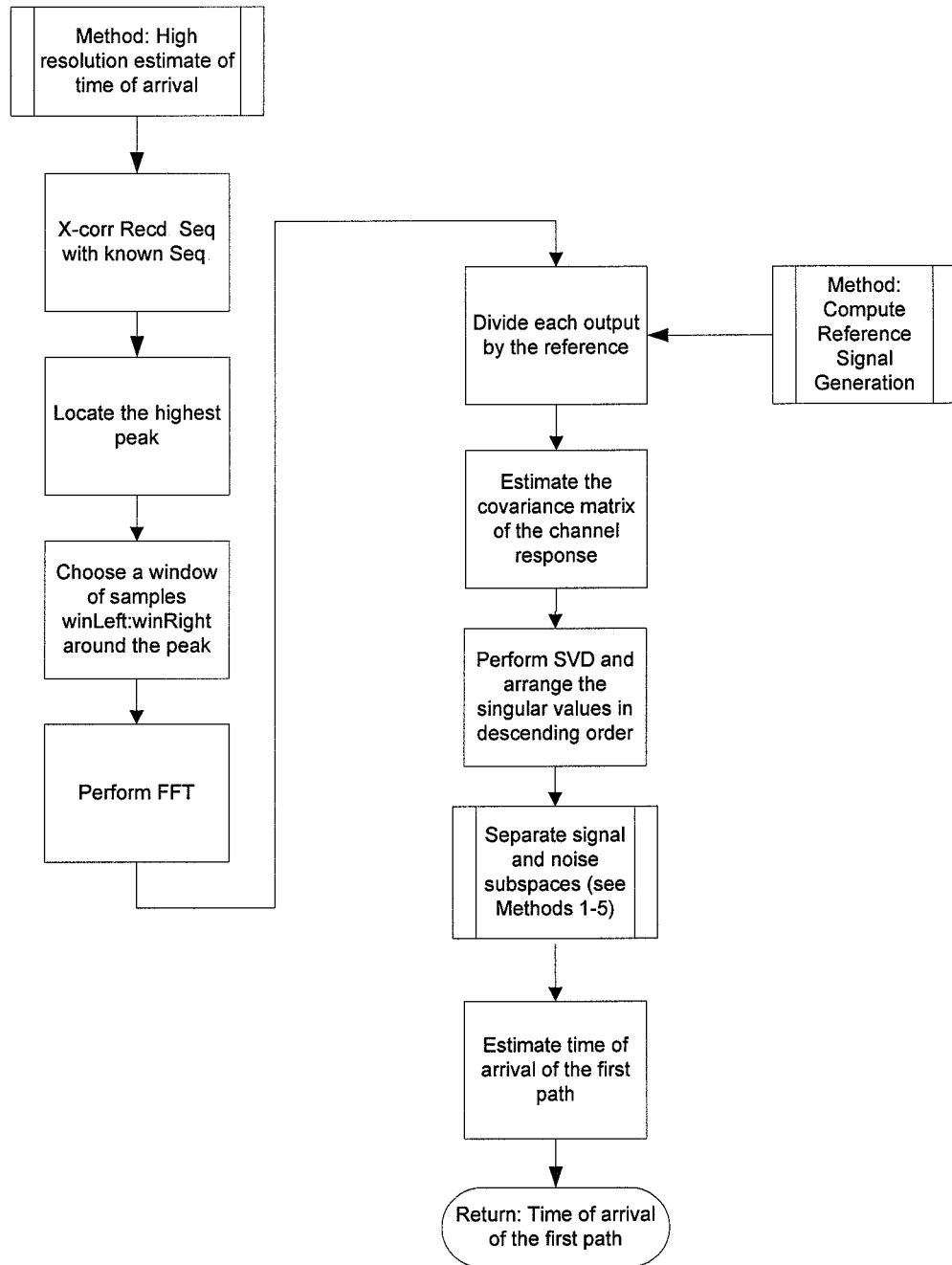
FIG. 19 illustrates estimating an earliest arriving path in h[n] in an embodiment.

FIG. 19 illustrates estimating an earliest arriving path in h[n] in an embodiment. The method to determine the earliest path comprises the following operations, but is not so limited:

1. Cross-correlate the received samples y[n] with the transmit sequence x[n] to obtain the result z[n]. When the cross-correlation is written in terms of a convolution, $z[n]=y[n] \otimes x*[-n]$ The equation can be re-written as $z[n]=h_{\mathit{eff}}[n] \otimes \phi_{xx}[n]$ where $\phi_{xx}[n]$ is the autocorrelation function of the pseudo-random sequence 2. Locate the first peak of z[n] and denote it as $n_{peak}$. Extract wL samples to the left of the peak and wR samples to the right of the peak of z[n] and denote this vector as pV.

$pV=[z[n_{peak}-wL+1] \ldots z[n_{peak}+wR]]$

The vector pV denotes the useful part of the cross-correlation result z[n]. In the ideal case, in the absence of channel distortion and when the channel BW is not limited, the choosing $wL=wR=f_sT_c$ would be sufficient to determine the timing of the received signal. In the presence of limited BW, for the case when the pseudo-random code x[n] is a sequence of +1/−1's, the optimal method to choose wL and wR are to choose them as the non-zero values (or, more generally, values>a certain threshold defined as a fraction of the peak value are selected) present on the left and right side of the peak of $p[n]=h_{tx}[n] \otimes h_{rx}[n]$ respectively. One other consideration in the choice of wL and wR is to select enough uncorrelated noise samples to obtain enough information regarding the noise sub-space. In addition, the integers wL and wR should be chosen to include all possible multipath components especially on the left side (i.e. through choice of wL) to help resolve far-out multipath components. Including too many samples beyond $f_sT_c$, increases the amount of noise introduced in the pV vector and hence has to be curtailed. Through simulation and experiments, a typical set of values for wL and wR are $3f_sT_c$ and $3f_sT_c$, respectively.

Note that z[n] (and in turn pV) contains the effect of the channel h[n], the transmit filter $h_{tx}[n]$, the receive filter $h_{rx}[n]$ and the autocorrelation function of the pseudo-random sequence $\phi_{xx}[n]$. In order to estimate the earliest arriving path in the channel, the other effects need to be eliminated. In many cases the transmit and receive pulse-shapes are matched for best noise performance, but that constraint is not required for this algorithm to work. The reference correlation function is defined as $\phi_{ref}[n]=\phi_{xx}[n] \otimes h_{tx}[n] \otimes h_{rx}[n]$ which needs to be estimated and eliminated before pV can be used for estimation of earliest arriving path.

3. The Reference correlation function $\phi_{ref}[n]$ is estimated next.

Figure 20:
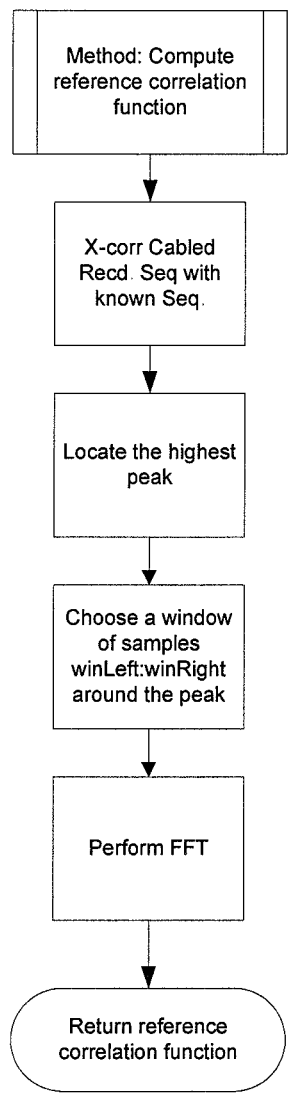
FIG. 20 illustrates estimating reference correlation function in an embodiment.

One method to obtain the reference cross-correlation is as follows: perform steps 1-2 on a ideal channel (a so called "cabled link") to obtain the corresponding peak vector $pV_{Ref}$. $pV_{Ref}$ contains the useful samples of the reference correlation function $\phi_{ref}[n]$. FIG. 20 illustrates estimating reference correlation function in an embodiment.

The "Cabled link" method involves sending the modulated signal from the transmitter front-end (power-amplifier and transmit antenna is by-passed) through an 'ideal' channel (for example, a cable) to the receiver front-end (bypass the receive antenna). Note that the 'ideal' channel can have some delay and attenuation, but should not add any other distortion and must have high SNR. For the best performance, the 'cabled' reference needs to be generated separately for each pseudo-random sequence as they have different autocorrelation functions and hence different references. It is also then critical to choose PRNs properly for the best autocorrelation functions (specifically, their close in autocorrelation side-lobes should be well suppressed compared to the peak) which will result in the best overall performance of the timing-resolution method, since autocorrelation sidelobes can get mistaken for multipath unless sufficiently attenuated.

Assuming transmit filter responses are controlled, one calibration of the response on cabled link is required per receiver during production. If receiver filter characteristics can be controlled (for example, for a bunch of receivers), then the calibration on cabled link of the response can be further reduced to one calibration measurement for a set of receivers.

An alternative method for determining the reference correlation function $\phi_{ref}[n]$ is to compute the individual components $\phi_{xx}[n]$, $h_{tx}[n]$ and $h_{rx}[n]$ analytically and to convolve them to arrive at the reference correlation function $\phi_{ref}[n]$. Note that this method depends on the extent to which transmit and receive filter impulse responses can be controlled in an actual implementation.

4. Improve the SNR in the estimate of pV by coherently averaging across multiple gold codes and even across multiple bits. Averaging across multiple bits can be done coherently after decisions on the individual bits being transmitted have been made. In other words using decision feedback before integration across bits. Note that improved SNR can be obtained equivalently by performing averaging in the cross-correlation function estimation in Step 1.

5. Calculate the Fast Fourier Transform (FFT) of length $N_{fft}$ of pV and $pV_{Ref}$ with zero padding of $N_{fft}-(wL+wR)$ zeros to obtain the length $N_{fft}$ vectors $pV_{Freq}$ and $pV_{Ref,Freq}$ respectively. An optimal value for $N_{fft}$ is obtained by checking resolvability of multipath through simulations using both synthetic and real measured channels. A typical value of $N_{fft}$ was found to be greater than or equal to 4096. The $$pV_{Freq} = FFT[pVzeropad]$$

$$pV_{Ref,Freq} = FFT[pV_{Ref}zeropad]$$

6. Calculate $$H_{full}[k] = \frac{pV_{Freq}[k]}{pV_{Ref,Freq}[k]}$$

to obtain the frequency domain estimate (corrupted with noise) of the channel h[n]. If the received sequence y[n] is oversampled by $N_{os}$ (i.e.

$$N_{os} = \frac{f_s T_c}{2}$$

for a transmit pulse shape band-limited to $+/-1/Tc$) and if the transmit and receive pulse-shaping filters are perfectly band-limited with BW=1/Tc, then exactly $$N = \frac{N_{fft}}{2N_{os}}$$

positive and negative samples around DC of $H_{full}[k]$ are non-zero (i.e. usable) for estimation of the real channel, $H_{real}[k]$. From our studies, we have concluded that $$\frac{N_{fft}}{2\alpha N_{os}}$$

samples on either side of DC should be picked for the best performance of the resolution algorithm, where $\alpha>1$ is chosen based on the actual pulse-shaping filters used at the transmitter and receiver and the autocorrelation function $\phi_{xx}[n]$. Note that including the frequency transition band of $\phi_{ref}[n]$ causes noise enhancement and a is chosen large enough to exclude these frequencies in the selected samples. However, choosing a too large will cause loss of signal information. A preferred choice of $\alpha=1.25$ for real band-limited functions based on raised-cosine filter shapes with small excess bandwidth has been used in the implementation.

7. If the DC component of $H_{full}[k]$ is at index 0, the reduced H vector, H[ ] is defined as:

$$H=[H_{full}[N_{fft}-N+1] \ldots H_{full}[N_{fft}]H_{full}[0]H_{full}[1] \ldots H_{full}[N]]$$

8. Construct the matrix P from the reduced channel estimate vector H[k], $$P = \begin{bmatrix} H(M) & \ldots & H(2N-1) & H'(0) & \ldots & H'(2N-M+1) \\ H(M-1) & \ldots & H(2N-2) & H'(1) & \ldots & H'(2N-M+2) \\ \vdots & \ddots & \vdots & \vdots & \ddots & \vdots \\ H(0) & \ldots & H(2N-M+1) & H'(M) & \ldots & H'(2N-1) \end{bmatrix}$$

where $1<M<2N$ is a parameter and ( )' represents conjugate of the complex number. Define the estimated covariance matrix R of the reduced channel estimate vector H[k] as $$R = P \times P'$$

If M is chosen to be too small (close to 1), then the eigen-values of R are very limited in number and, as a result, the high-resolution algorithm cannot delineate between the signal and noise. If M is chosen too large (close to 2N), then the covariance matrix estimate R is unreliable as the amount of averaging in obtaining the covariance is inadequate and also the covariance matrix R obtained is rank-deficient. Thus, a value of M which is right in the middle of its allowable range i.e. M=N is a good choice. This has also been verified empirically.

9. Perform singular value decomposition (SVD) on R as $$R = UDV'$$

Where U is a matrix of the left singular vectors, V is the matrix of the right singular vectors and D is the diagonal matrix of singular values.

10. Construct the vector of sorted singular values sV as: sV=diagonal elements of D sorted in descending order.
11. The next key step is to separate the signal and noise subspaces. In other words, to select an index ns in the vector sV such that the singular values sV[ns+1] . . . sV[N] correspond to noise. Define a vector of noise singular values as $sV_{noise}$.

There are a number of methods possible to separate the singular values corresponding to the noise subspace and find a representation for the basis vectors of the noise sup-space:

a) All singular values which are smaller than $$\frac{\max(sV)}{T_1}$$

where $T_1$ is a threshold value which is a function of the signal-noise ratio (e.g. SNR on the chip) $T_1=f(SNR)$.

Figure 21:
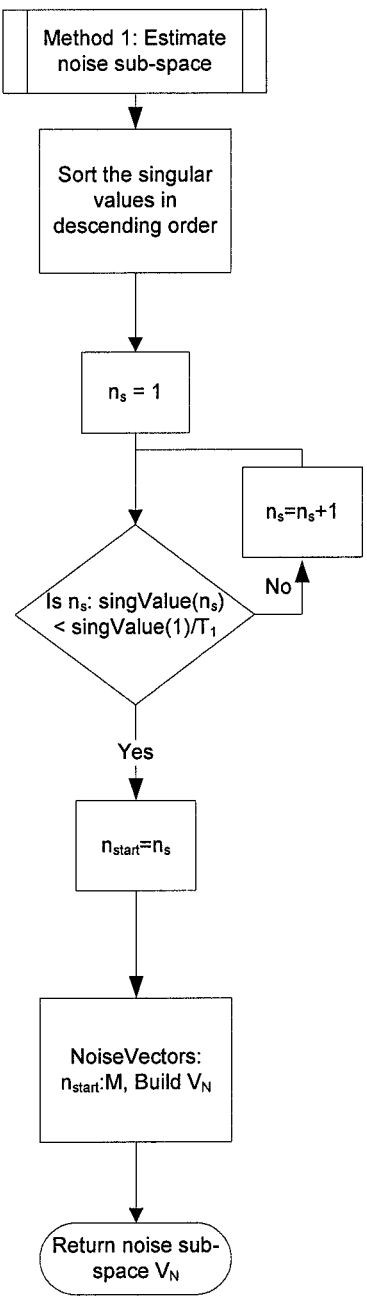
FIG. 21 illustrates estimating noise sub-space in an embodiment.

FIG. 21 illustrates estimating noise sub-space in an embodiment.

b) All singular values less than $$\min\left(\frac{\max(sV)}{T_1}, \operatorname{mean}(sV(L:M)) \times T_2\right),$$

where L is a parameter which can be chosen greater than delay-spread (e.g. N/2) and $T_2$ is another threshold value determined empirically (typical value can be 1000).

Figure 22:
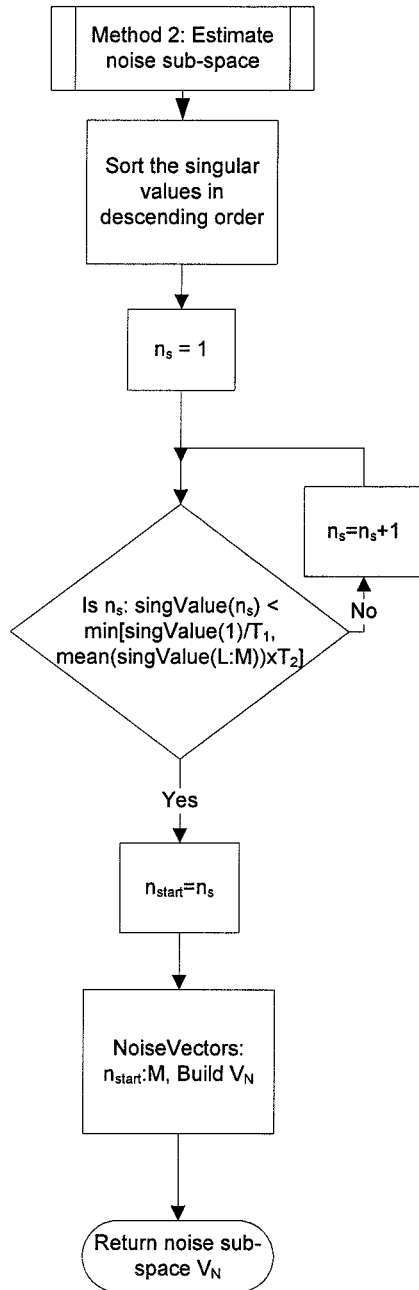
FIG. 22 illustrates estimating noise sub-space in an embodiment.
Figure 23:
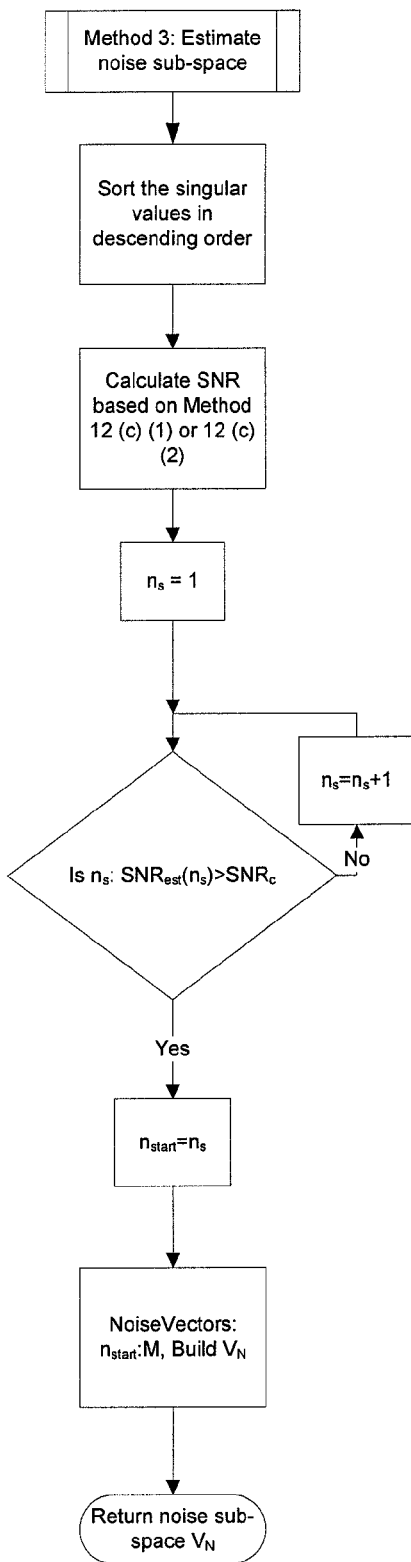
FIG. 23 illustrates estimating noise sub-space in an embodiment.

FIG. 22 illustrates estimating noise sub-space, under an alternative embodiment.

c) Another method involves determining the noise subspace by repeatedly estimating the SNR for different partitions of noise and signal-plus-noise subspaces and comparing with another estimate of SNR. FIG. 23 illustrates estimating noise sub-space, under another alternative embodiment.

1) Calculate estimate of SNR as follows:
   i. Assume that the noise is represented by the sV( ) ns,ns+1 . . . M, Calculate noise variance as:

$$\sigma_{est}^2(n_s) = \frac{\sum_{i=n_s}^{M} sV(i)}{M - n_s + 1}$$

ii. Calculate the signal power as $P_{sig}(n_s)=\Sigma_{i=1}^{n_s-1}(sV(i)-\sigma_{est}^2(n_s))$
   iii. Estimate of SNR:

$$SNR_{est}(n_s) = \frac{P_{sig}(n_s)}{\sigma_{est}^2(n_s)}$$

2) An alternative estimate of SNR is obtained through other methods (e.g. SNR on chip). One method of estimating SNR directly is as follows:
   i. If the received data samples (after frequency error removal and re-sampling to Tc-spaced samples and code de-correlation) are given by $X_i$ (where the $X_i$ are chip-spaced starting from the interpolated peak position).

$$X_i = S + N_i$$

ii. The signal is estimated as $$\hat{S} = \frac{1}{N}\sum_{i=0}^{N-1} X_i$$

iii. The noise is estimated as $$\hat{N} = \frac{1}{N-1}\sum_{i=0}^{N-1}(X_i - \hat{S})^2$$

iv. The SNR is estimated as $$\widehat{SNR_c} = \frac{\hat{S}}{\hat{N}}$$

3) Choose the noise singular values as sV(ns, ns+1, . . . , M) which satisfy the following condition:

$$n_{start}=[\text{smallest } n_s:SNR_{est}(n_s) > \widehat{SNR_c}]$$

d) Another method involves determining the noise subspace by repeatedly estimating the SNR for different partitions of noise and signal subspaces using c)1) and choosing a partition $n_{start}$ such that $$n_{start}=\operatorname{argmax}_{n_s}[SNR_{est}(n_s)-SNR_{est}(n_s-1)]_{n_s=2}^{K}.$$

Figure 24:
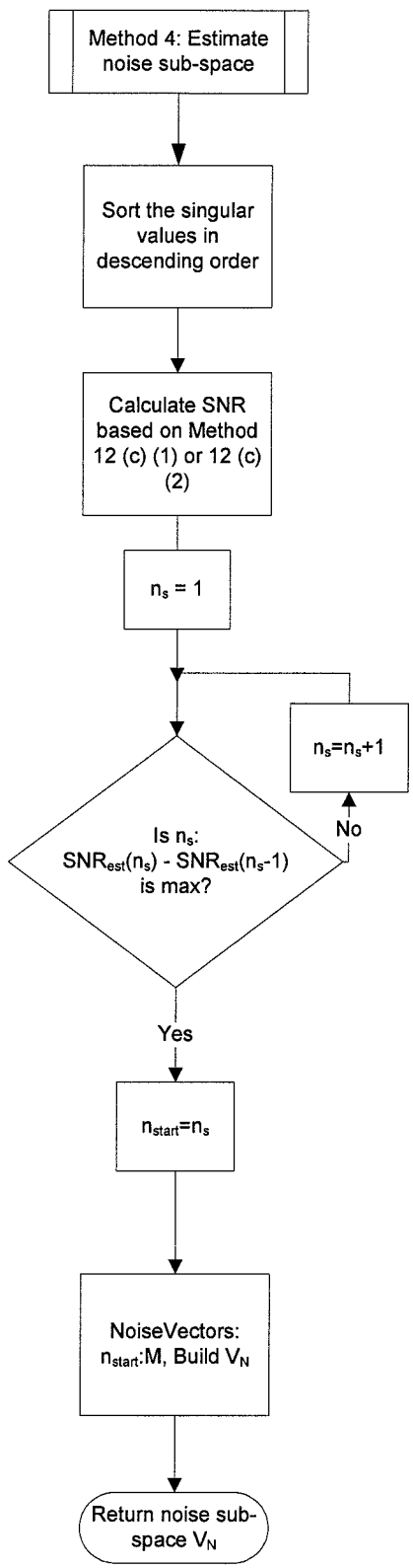
FIG. 24 illustrates estimating noise sub-space in an embodiment.
Figure 25:
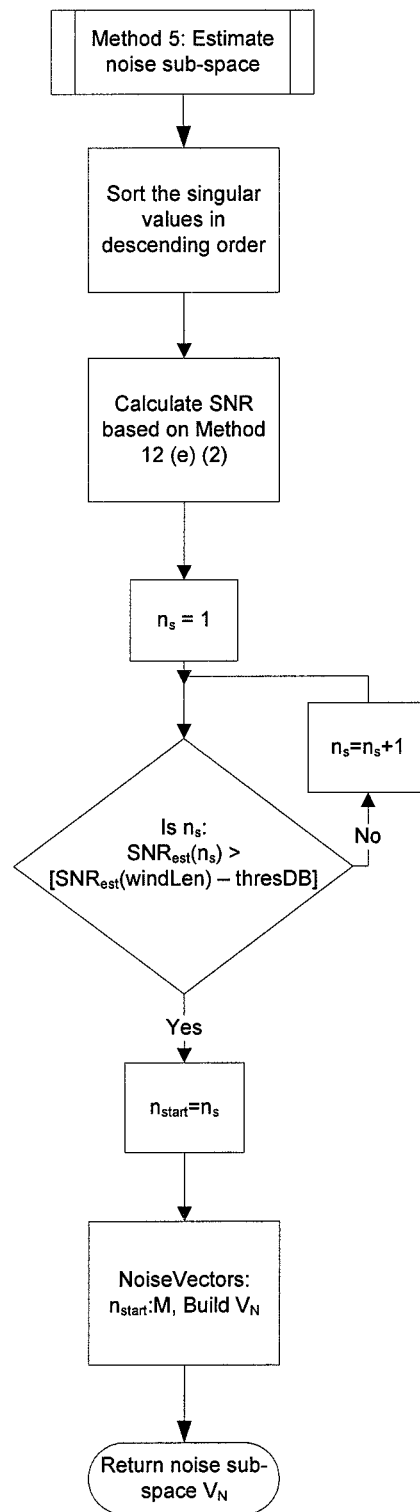
FIG. 25 illustrates estimating noise sub-space in an embodiment.

FIG. 24 illustrates estimating noise sub-space, under yet another alternative embodiment.

e) FIG. 25 illustrates estimating noise sub-space, under still another alternative embodiment.
1) Define $$wLen = \frac{wL + wR}{f_s T_c}.$$

Then the first wLen singular values represent the significant signal-plus-noise subspace or noise subspace singular values (the rest of the singular values represent correlated noise and signal and quantization effects).

2) Calculate estimate of SNR as follows:
   i. Assume that the noise is represented by the sV(i): i=$n_s$, $n_s$+1 . . . wLen; 1<$n_s$<wLen, calculate noise variance as:

$$\sigma_{est}^2(n_s) = \frac{\sum_{i=n_s}^{wLen} sV(i)}{wLen - n_s + 1}$$

ii. Calculate the signal power as $P_{sig}(n_s)=\Sigma_{i=1}^{n_s-1}[sV(i)-\sigma_{est}^2(n_s)]$
   iii. Estimate of SNR:

$$SNR_{est}(n_s) = \frac{P_{sig}(n_s)}{\sigma_{est}^2(n_s)}$$

3) Define $n_{start}$=[smallest $n_s$:$SNR_{est}(n_s)$>($SNR_{est}$(wLen)−thresDB)]. Then $n_{start}$ up to winLen represent the noise singular values. A typical value of thresDB is 10.

12. Choose the corresponding noise right-singular vectors to build $V_N$ i.e. choose all vectors in V which correspond to the noise singular values and build the noise subspace matrix $V_N$.

13. Estimate Time of Arrival of the first path:
   a) Define $$\omega(\tau) = \begin{bmatrix} 1 & e^{\frac{j2\pi}{N_{fft}}\tau} & e^{\frac{j2\pi}{N_{fft}}2\tau} & e^{\frac{j2\pi}{N_{fft}}3\tau} & \ldots & e^{\frac{j2\pi}{N_{fft}}(M-1)\tau} \end{bmatrix}^H$$

b) Calculate $$\Omega(\tau) = \frac{1}{\omega(\tau)^H V_N V_N^H \omega(\tau)}$$

for a range of values of $\tau(\tau \in [\tau_{max}, -\tau_{max}])$. The resolution of search $\Delta\tau$ can be chosen as small as required. As an example, $\tau_{max}=5$ and $\Delta\tau=0.05$ so that $\tau$ is searched for in the range $[-5,5]$ in steps of $0.05$.

14. Peaks of $\Omega(\tau)$ will provide the positions of channel impulses relative to the coarse peak, $n_{peak}$. Theoretically, first peak will correspond to LOS path. Based on information about the propagation environment which could be encoded in the transmission from the basestation, it is possible to control $\tau_m$. For example, if the delay-spread is large, then $\tau_{max}$ can be chosen to be larger (e.g. 10) and if it is less then $\tau_{max}$ can be chosen as a smaller value (e.g. 4).

Combination Methods: Apart from the standalone methods discussed above, numerous other combination methods are possible. Combination of schemes based on SNR on chip is an effective method. The following describes a list of combination schemes that can be realized in practice:

1. For chipSNR less than chipSNRRef, pick method 12(d) to choose noise singular values. Otherwise choose method 12(a).
2. For chipSNR greater than chipSNRRef, pick method 12(d) to choose noise singular values and estimate peak position. Otherwise, use direct peak estimation techniques (such as peak interpolation, peak shape) starting from the cross-correlation function z[n].
3. For chipSNR less than chipSNRRef, pick method 12(e) to choose noise singular values. Otherwise choose method 12(a).

A typical value of chipSNRRef is 10 dB.

Computation of Position

The location of the receiver unit is determined by the positioning engine available either on the terminal unit or the server. The receiver can use the range measurements from the system or combine the system range measurements with any of the measurements from other signals of opportunity. A sufficient set of range measurements yields a position fix provided that the measurements derive from known locations. The range equation in 3D space is given by $$r_i = \sqrt{(x_i-X)^2+(y_i-Y)^2+(z_i-Z)^2}.$$

The location of the transmitters is given by $(x_i, y_i, z_i)$ and the unknown location of the mobile units is given by $(X, Y, Z)$ in some local coordinate frame. Three or more transmitters produce three or more range measurements that are used to compute a fix. The measurement has a receiver time bias additive term as well, because the receiver time is not synchronized to the WAPS timing.

$$R_i = r_i + c\Delta t.$$

This equation is referred to later as "Pseudorange Measurement Equation". Note that the time bias is common because the transmitters are timing synchronized. The pseudoranges must be corrected for transmit timing corrections which are available from the data stream embedded in the transmission from each transmitter. This delta time bias creates a new unknown parameter, so a minimum of four measurements are used for a solution. A barometric altimeter measurement provides the needed information for a solution as $$\text{Baro} = (z_b - Z).$$

One method of solving these non-linear simultaneous equations is to linearize the problem at an arbitrary initial point and then iteratively finding corrections to this initial position to iteratively leads to the final solution. This method uses an initial guess for the X, Y, Z solution, so the centroid of the transmitters is used as $$(X_0, Y_0, Z_0) = (1/n) \sum_{i=1}^{n} (x_i, y_i, z_i).$$

The final position solution is assumed to be of the form $$(X,Y,Z,\Delta t) = (X_0, Y_0, Z_0, \Delta t_0 = 0) + (dX, dY, dZ, d\Delta t)$$

The geometric range can be expanded in a Taylor series about $(X, Y, Z, \Delta t) = (X_0, Y_0, Z_0, \Delta t_0)$ $$R_i = \sqrt{(x_i - X)^2 + (y_i - Y)^2 + (z_i - Z)^2} +$$

$$c \Delta t = \sqrt{(x_i - X_0)^2 + (y_i - Y_0)^2 + (z_i - Z_0)^2} +$$

$$c \Delta t_0 + \frac{\partial r}{\partial x}\bigg|_{(X_0, Y_0, Z_0, \Delta t_0)} dX + \frac{\partial r}{\partial y}\bigg|_{(X_0, Y_0, Z_0, \Delta t_0)} dY +$$

$$\frac{\partial r}{\partial z}\bigg|_{(X_0, Y_0, Z_0, \Delta t_0)} dZ = \hat{r}_i + \frac{\partial r}{\partial x}\bigg|_{(X_0, Y_0, Z_0, \Delta t_0)} dX +$$

$$\frac{\partial r}{\partial y}\bigg|_{(X_0, Y_0, Z_0, \Delta t_0)} dY + \frac{\partial r}{\partial z}\bigg|_{(X_0, Y_0, Z_0, \Delta t_0)} dZ + c\, d\Delta t$$

where the estimated ranges are computed as $$\hat{r}_i = \sqrt{(x_i - X_0)^2 + (y_i - Y_0)^2 + (z_i - Z_0)^2}.$$

and the partial derivatives are given by $$\partial R/\partial x = \partial r/\partial x = (x_i - X)/r_i \quad \partial R/\partial \Delta t = c$$

$$\partial R/\partial y = \partial r/\partial y = (y_i - Y)/r_i$$

$$\partial R/\partial z = \partial r/\partial z = (z_i - Z)/r_i.$$

In this embodiment, four linear equations with four unknowns are shown. Additional range estimates would produce more rows in the matrix. The result is the set of equations $$\begin{bmatrix} (x_1 - X_0)/\hat{r}_1 & (y_1 - X_0)/\hat{r}_1 & (z_1 - Z_0)/\hat{r}_1 & 1 \\ (x_2 - X_0)/\hat{r}_2 & (y_2 - Y_0)/\hat{r}_2 & (z_2 - Z_0)/\hat{r}_1 & 1 \\ (x_3 - X_0)/\hat{r}_3 & (y_3 - Y_0)/\hat{r}_3 & (z_3 - Z_0)/\hat{r}_1 & 1 \\ 0 & 0 & 1 & 0 \end{bmatrix} \times \begin{bmatrix} \delta X \\ \delta Y \\ \delta Z \\ c\, \delta \Delta t \end{bmatrix} = \begin{bmatrix} R_1 - \hat{r}_1 \\ R_2 - \hat{r}_2 \\ R_3 - \hat{r}_3 \\ z_b - Z_0 \end{bmatrix}$$

The last row of the observation matrix represents the barometric altimeter measurement. The column of three 1 represents the same time bias on all three ranges. These equation are in the form of $Ax=b$. The solution $x=A^{-1}*b$. Note that in the absence of a barometer measurement, one more additional measurement would add an additional row similar to rows 1 to 3 of the matrix above. This additional measurement would enable estimation of the altitude of the receiver. Note that when there are more measurements available than the number of unknowns, then the solution would be based on the pseudoinverse of A given by $A_+=(A^TA)^{-1}A^T$ and the least square solution is given by $x=A_+^{-1}b$. When the quality of measurements are not equal, the optimal way of solving the equations Ax=b in the least square sense is to use a weight proportional to the SNR for the error from each equation. This leads to a solution $x=A_+^{-1}b$ with $A_+=(A^TWA)^{-1}A^TW$. The diagonal weighting matrix W formed by the weight proportional to the noise variance of the measurements. The solution of these equations produces a delta correction to the X, Y, Z and delta time estimates, such that $$\begin{bmatrix} X_1 \\ Y_1 \\ Z_1 \\ \Delta t_1 \end{bmatrix} = \begin{bmatrix} X_0 \\ Y_0 \\ Z_0 \\ \Delta t_0 \end{bmatrix} + \begin{bmatrix} \delta X \\ \delta Y \\ \delta Z \\ \delta \Delta t \end{bmatrix}.$$

This completes the first iteration of the method. The updated position and time bias estimates replace initial guess and the algorithm continue until the delta parameters are below some threshold value. A typical stopping point would be for the norm of the delta values are below a certain threshold (for example, one meter).

The system of linearized equations in the GPS is solved using least squares and an initial guess about the location of the user such that the algorithm converges to the final user location. The linearization is based on the fundamental assumption that the distance between the satellites and the user position is larger than the distance between the user position on the earth and the guessed position. For the same set of equations to work in a terrestrial environment (with small geometry), the initial guess can be based on the centroid (as above), a point close to the transmitter from which the received signal is the strongest, or obtained by a direct method which gives a closed form solution by means of a sequence of formulae with no iterations. When the initial guess is a centroid or a point close to the transmitter from which the received signal is the strongest, the initial guess is improved using a least squares method. When the initial guess is obtained by a direct method which gives a closed form solution by means of a sequence of formulae with no iterations, the initial solution itself is the final solution and it is improved using least squares only when there are more measurements (and hence equations) than unknowns with individual measurements weighted by using the expected errors in those measurements (which are obtained from such parameters as signal strength and elevation angle). Further, if a sequence of measurements is to be processed in time, a solution obtained as above may be fed to a Kalman filter to obtain an optimal solution "trajectory".

Another approach that overcomes the linearization problem in terrestrial cases involves formulating the set of equations as a non-linear minimization problem (specifically as a weighted non-linear least squares problem). Specifically, the non-linear objective function to be minimized is defined as $$f(X, Y, Z, \Delta t) = \sum_{i=0}^{N-1} W_i \times \left[ R_i - \sqrt{(x_i - X)^2 + (y_i - Y)^2 + (z_i - Z)^2} - \Delta t \right]^2$$

The weights $W_i$ are chosen to be inversely proportional to the SNR of the measured ranges $R_i$. The best estimate of the receiver location is obtained as the set of $(X,Y,Z,\Delta t)$ that minimizes the objective function. When barometer or other altitude aiding is available then the objective function gets modified to $$f(X, Y, Z = Z_{baro}, \Delta t) = \sum_{i=0}^{N-1} W_i \times \left[ R_i - \sqrt{(x_i - X)^2 + (y_i - Y)^2 + (z_i - Z_{baro})^2} - \Delta t \right]^2$$

The position solution based on this method will be more stable and robust, particularly under small geometry terrestrial system configuration. In this configuration, small changes in receiver coordinates significantly changes the observation matrix and sometimes leads to lack of convergence of the linearized iterations. Convergence to a local minimum or divergence occurs more often due to residual bias in the measurements which affects the shape of the objective function so that local minima can be present. Residual bias can be quite common in indoor/urban canyon environments. The non-linear formulation above makes the position algorithm robust to measurement bias besides overcoming the small geometry linearization problem.

One approach to perform the minimization of the function $f$ to obtain optimal X, Y, Z is to use a genetic algorithm (such as differential evolution) to find the global minimum of the function. The use of such an algorithm enables the solution to avoid local minima that occur in small geometry terrestrial positioning when multi-path bias is present in the range measurements.

Irrespective of whether linearized least squares or non-linear least squares method is used to solve the pseudo-range measurement equations, it is important for a quality metric to be provided along with a position estimate. The position quality metric should be a function of the pseudo-range measurement equation residuals, the quality of the measurements as well as the geometry of the towers relative to the estimated position. The pseudo-range measurement residual for the ith tower measurement is given by $$PR_{res,i} = R_i - (\sqrt{(x_i-X)^2+(y_i-Y)^2+(z_i-Z)^2} + c\Delta t)$$

The average weighted rms pseudo-range residual is given by $$PR_{res} = \sqrt{\left( \frac{\sum_i W_i \times PR_{res,i}^2}{\sum_i W_i} \right)}$$

The HDOP, VDOP, PDOP are defined from the diagonal elements of $H=(A^TA)^{-1}A^T$ as $$HDOP = \sqrt{H(1,1)+H(2,2)}$$

$$VDOP = H(3,3)$$

$$PDOP = \sqrt{H(1,1)+H(2,2)+H(3,3)}$$

The pseudo-range RMS (root-mean-square) error at a particular SNR is given by $$PRE_{th} = f(\sqrt{SNR})$$

where $\underline{f}$ is generally a non-linear monotonic decreasing function of its argument. The function $\underline{f}$ can be derived analytically for a particular receiver configuration as a function of signal BW and receiver BW or alternatively, found from simulation as a table mapping SNR to range error.

The quality metric for 2-D position is defined as $$QM_{2\text{-}D} = HDOP \times \sqrt{PR_{res}^2 + PRE_{th}^2} \times \alpha$$

Similarly, the quality metric for the altitude and 3-D position is given by $$QM_{alt} = VDOP \times \sqrt{PR_{res}^2 + PRE_{th}^2} \times \alpha$$

$$QM_{3\text{-}D} = PDOP \times \sqrt{PR_{res}^2 + PRE_{th}^2} \times \alpha$$

The quantity $\alpha$ is chosen based on the level of confidence desired. For example, a value of 3 would be used to obtain 95% confidence, while a value of 1 would be used for 68% confidence.

Another method of positioning using the WAPS system involves the use of a WAPS reference receiver in a differential scheme. As shown in "Differential Wide Area Positioning System" and discussed in the context of timing synchronization, the time-stamped reference receiver measurements along with the latitude, longitude, altitude of the WAPS towers and the reference receiver can be used to determine the timing delta between WAPS tower transmissions at the specific time-stamp. Once the timing delta between transmitters is known, the range equations can be reduced to have a single common time bias again. The WAPS receiver then can avoid demodulation of the WAPS data stream (for example, to extract the timing corrections from the data stream). The WAPS receiver measurements can be sent to the server and the position can then be computed at the server or, alternatively, the reference receiver measurements can be relayed to the WAPS receiver and the position can be computed there. It is assumed that the latitude, longitude and altitude of the WAPS towers is already known/available for use in the position computation. In the case that the WAPS data stream is secure, this differential system can avoid the need to extract data from the secure data stream for timing correction purposes.

Another alternative method for obtaining positioning from the WAPS system uses RSSI finger-printing techniques. A database of WAPS tower transmit powers/locations and RSSI levels is built up for a given target area based on training measurements in the area for which positioning is required. Note that RSSI database can also be augmented with Angle of Arrival (AOA) information to improve the solution. The WAPS receiver RSSI measurements (and possibly AOA measurements) are then used to look up this database to obtain a location estimate. An alternative method of using the WAPS RSSI measurements would be to translate the measurements into a range estimate using a propagation model (or simple extrapolation/interpolation techniques) and then use tri-lateration to determine the position. Note that the RSSI measurements in these finger-printing techniques can be replaced by any other measurements that can be translated to range.

An alternative method of computing position using the WAPS infrastructure uses a blind method for obtaining positioning from the WAPS system without prior knowledge of the WAPS tower locations. In this method, the approximate location of the WAPS towers are determined by field measurement (for example, by measuring RSSI from many angles around the WAPS tower at GNSS tagged locations and then using a weighted average based on RSSI of these locations to estimate WAPS tower locations). Then, any of the RSSI finger-printing methods can be used to determine position (for example, as described in the above paragraph).

An alternative method of computing position using the WAPS infrastructure can be used for computing position offline. The position computation involves storing the sample segments of the WAPS signal (for example, the stored data maybe I data at low IF or IQ data at baseband) from the WAPS receiver along with optionally an approximate position and a WAPS time tag. Note that it is enough to store enough samples to be able to acquire the signal. The samples are processed at a later time to search, acquire and compute range to WAPS towers. The method may use offline data to look-up tower locations and timing correction information that may be stored in a central database on a server. This method of offline position computation provides the ability to support WAPS positioning at the cost of only memory on the device. The other advantage of this method is the time taken for storing the WAPS IQ data is very short, making it convenient for applications that need to tag position quickly, but the exact position is not required instantaneously. One possible application for this method can be for geo-tagging of photographs.

Another approach to positioning uses carrier phase measurements in addition to the code phase measurements indicated above. The carrier phase measurements can be written as:

$$\phi_i(t_0) = r_i(t_0) + N_i \lambda + \Delta t$$

Various techniques can be used to resolve the integer ambiguity $N_i$ in the carrier phase measurements. Code phase measurements, measurements at multiple frequencies and/or other methods can be used to resolve the ambiguities. Subsequently, the carrier phase measurements at time $t_k$ can provide accurate tracking of position starting from an accurate initial position. The carrier phase measurements at future times can be written as $$\phi_i(t_k) = r_i(t_k) + N_i \lambda + \Delta t$$

The $N_i$ do not change as long as the carrier phase measurements do not have cycle slips (i.e. the signals should be tracked with continuous phase lock) and the new locations can be computed using least squares. Alternatively, these measurements can be used in a Kalman filter to update the new position state. If phase lock is lost, new values of integer ambiguity need to calculated.

Another approach uses differential positioning relative to a reference receiver as described above. Differential positioning can be done using either code or carrier measurements or a combination of both. Single difference observables are computed for code and carrier phase by subtracting measurements of the same towers from reference receiver r and receiver s as $$R_{sr}^i = \underbrace{\rho_s^i - \rho_r^i}_{\substack{\text{geometrical range} \\ \text{difference}}} + \underbrace{c(dt_s - dt_r)}_{\substack{\text{time difference} \\ \text{between clocks}}} + (\varepsilon_{R,s} + \varepsilon_{R,r})$$

$$\Phi_{sr}^i = \underbrace{\rho_s^i - \rho_r^i}_{\substack{\text{geometrical range} \\ \text{difference}}} + \underbrace{c(dt_s - dt_r)}_{\substack{\text{time difference} \\ \text{between clocks}}} + \underbrace{\lambda(N_s^i + N_r^i)}_{\substack{\text{integer ambiguity in} \\ \text{phase measurement}}} + (\varepsilon_{\phi,s} - \varepsilon_{\phi,r}).$$

Note that any timing error in the transmitter does not appear in these observables and thus allows position solutions even when the system is asynchronous or imperfectly synchronized. In addition, any tropospheric delay error in measurements nearly cancels out since the tropospheric delay is likely to be correlated in the local area for short baselines (e.g., distances between reference receiver r and receiver s). A communication channel is used to send the range and carrier measurements from the reference receiver r to the receiver s for position computation. Or, alternatively, the receiver s and receiver r need to communicate the range and carrier to the server for position computation.

In any position solution method, the height of a receiver can be determined using placement on a terrain map or barometric sensing. Using placement on a map, during trilateration the location of the user can be constrained to be on a terrain based on a terrain database and the height of the user determined. The height of the user can also be constrained to be within a certain height above the terrain. For example, based on the tallest building in the area, the maximum altitude above terrain can be constrained. This type of constraint can improve the quality of the height solution (for example, by eliminating the ambiguous solution that is sometimes produced when using biased range measurements).

In addition, if indoor building maps are available, the information (along with associated constraints on possible user locations) can be used to aid the position solution For example, physical restrictions can be used to constrain the user motion model, and thereby improve the quality of the tracking Kalman position filter. Another usage of building maps is to determine/estimate the quality of a particular tower's range measurement based on the physical environment from the tower to the indoor location. A better estimate of range quality can be used to weight the position computation leading to better position estimates.

When using a barometric sensor, a calibrated barometric sensor can be used to measure the pressure differences as the receiver terminal is moved up or down in altitude. This is compared with a calibrated value for the pressure on different altitudes or an average value to determine the height of the receiver.

In computing the position solution, when additional measurements greater that the minimum three measurements required for two-dimensional position are available, receiver integrity monitoring based on a check of consistency of measurements is used to eliminate "outlier" measurements. The "outlier" measurements could be due to loss of timing synchronization at the transmitter or due to the channel effects such as multipath.

Hybrid Positioning and Information Exchange with Other Systems

The system of an embodiment can be combined with any 'signal of opportunity', in order to provide positioning. Examples of a signal of opportunity include, but are not limited to, one or more of the following: GPS receivers; Galileo; Glonass; Analog or Digital TV Signal; signals from systems such as MediaFLO, Wi-Fi; FM signals; WiMax; cellular (UMTS, LTE, CDMA, GSM etc); bluetooth, and, LORAN and e-LORAN receivers.

Figure 26:
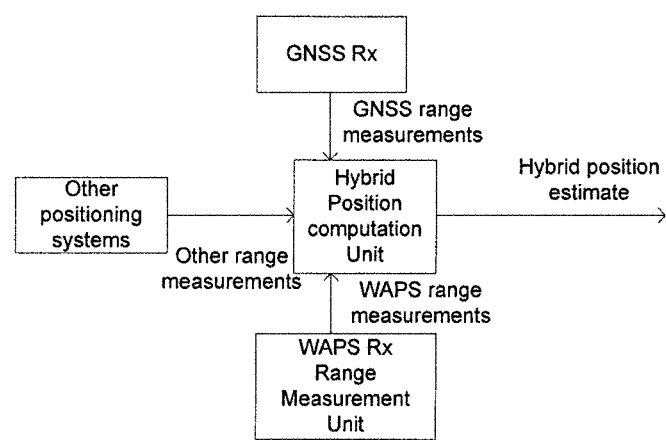
FIG. 26 shows hybrid position estimation using range measurements from various systems in an embodiment.
Figure 27:
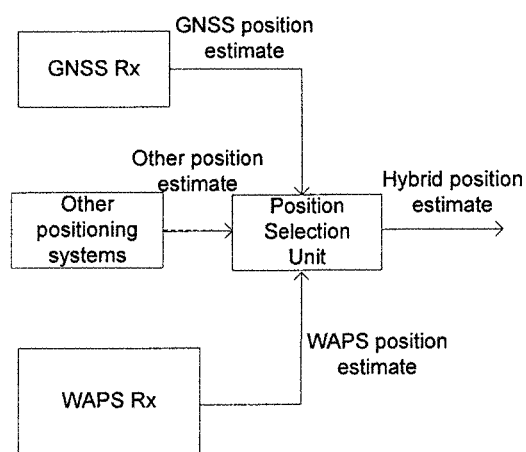
FIG. 27 shows hybrid position estimation using position estimates from various systems in an embodiment.
Figure 28:
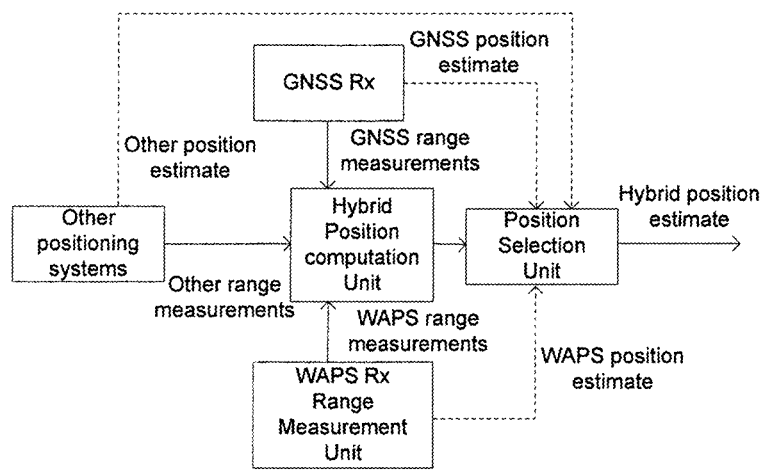
FIG. 28 shows hybrid position estimation using a combination of range and position estimates from various systems in an embodiment.

Regardless of signal type, the signal of opportunity provides a range measurement or a proxy for a range measurement, such as signal strength. This proxy for a range is weighed and combined appropriately to get an estimate for the location. The weighting may use the signal-to-noise ratio (SNR) of the received signals or, alternatively, use a metric that defines the environment of the receiver (e.g., knowledge of urban, suburban, rural environment from assistance data, whether the receiver is indoor or outdoor based on input from the application). This is typically done in those environments where the system of an embodiment is unavailable or signal coverage is limited. When using the SNR for a weight for a particular measurement the weight may simply be an inverse function of the SNR (or any other function that provides lower weight to signals with lower SNR) to allow optimal combination of the WAPS measurements as well as other system measurements to obtain a position. The final positioning solution may be calculated either by taking range measurements from the additional signal sources and combining with the WAPS range measurements and deriving a position solution for latitude, longitude and height, or by taking the position measurements from the additional sources/devices and the position measurements from the WAPS system and providing an optimized location solution using a combination of these location measurements based on the position quality metric from different systems. The various configurations of obtaining a hybrid solution using WAPS measurements/WAPS position estimates are shown in FIG. 26, FIG. 27, and FIG. 28. Any of the architectures described below can be selected for use depending on the hardware and software partitioning of the system.

FIG. 26 shows hybrid position estimation using range measurements from various systems in an embodiment. The range measurements (along with associated range quality metrics) are used from GNSS and other positioning systems and combined in a single optimal position solution by a hybrid position engine. This architecture is the most optimal in terms of using the available data to get the best position estimate out of them.

FIG. 27 shows hybrid position estimation using position estimates from various systems in an embodiment. Independent position estimates from different systems along with position quality are used to choose the one with the best quality. This architecture is the easiest to implement and integrate since the different positioning system are well isolated.

FIG. 28 shows hybrid position estimation using a combination of range and position estimates from various systems in an embodiment. For example, a position estimate from a WLAN positioning system can be compared with position estimate from range measurements from GNSS and WAPS systems to arrive at the best solution.

Inertial Navigation Sensors (INS) such as accelerometers and gyros, magnetic sensors such as e-compass, pressure sensors such as altimeters can be used to provide location aiding information (referred to as loose coupling) or raw sensor measurements (referred to as tight coupling) to the WAPS system for usage in tracking mode.

An accelerometer can be used in the receiver of an embodiment to determine a frequency for updating the position reporting to the server. A combination of sequence of position solutions and accelerometer measurements can be used to detect static position, constant velocity and/or other movement. This movement data or information can then be used to determine the frequency of the updates such that, for example, when there is non-uniform motion the frequency of updates can be set to a relatively high frequency, and when the receiver is at a constant velocity or stationary for a pre-determined period of time the frequency of the updates can be reduced to save power.

Figure 29:
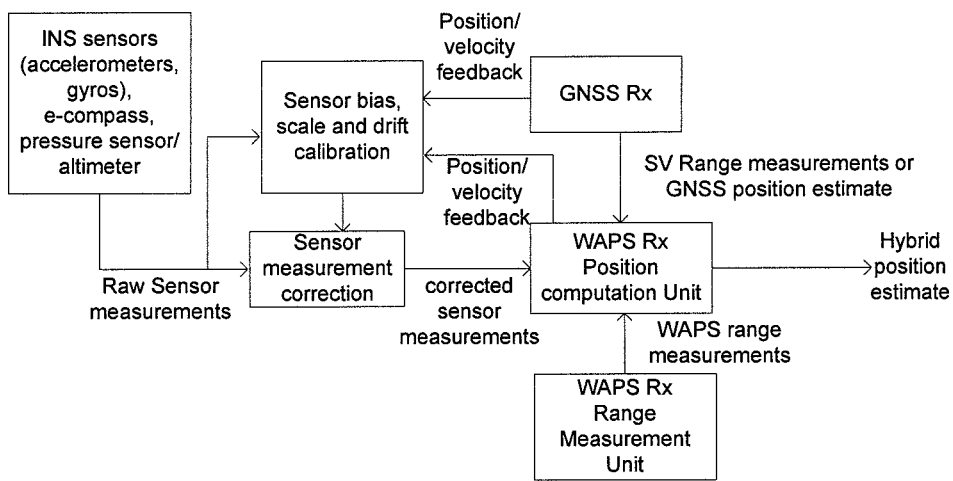
FIG. 29 illustrates determining a hybrid position solution in which position/velocity estimates from the WAPS/GNSS systems are fed back to help calibrate the drifting bias of the sensors at times when the quality of the GNSS/WAPS position and/or velocity estimates are good in an embodiment.
Figure 30:
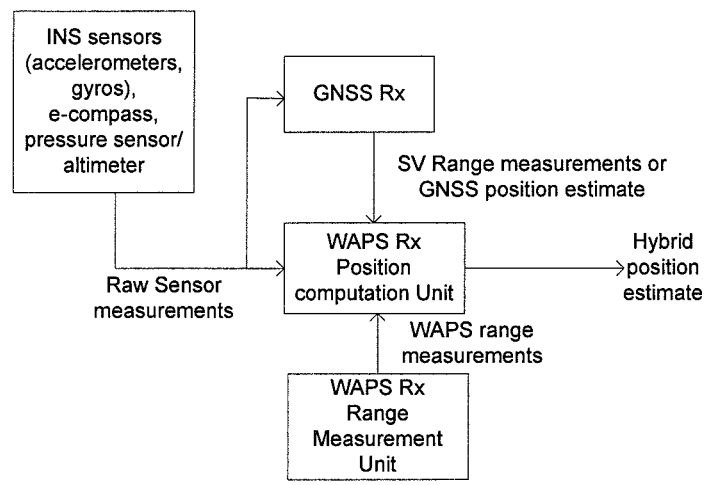
FIG. 30 illustrates determining a hybrid position solution in which sensor parameters (such as bias, scale and drift) are estimated as part of the position/velocity computation in the GNSS and/or WAPS units without need for explicit feedback in an embodiment.

The sensor or position measurements can be combined into a position solution in a position filter (such as a Kalman filter). Two types of tight coupling architectures, where the sensor measurements are combined with GNSS and WAPS measurements in the WAPS hybrid position engine, are illustrated in FIG. 29 and FIG. 30. FIG. 29 illustrates determining a hybrid position solution in which position/velocity estimates from the WAPS/GNSS systems are fed back to help calibrate the drifting bias of the sensors at times when the quality of the GNSS/WAPS position and/or velocity estimates are good in an embodiment. This architecture simplifies the algorithm formulation by partitioning the sensor calibration and position calculation parts of the algorithm. However, the drawback of this method is the complexity in deciding when are the good times to re-calibrate the sensors using WAPS/GNSS estimates.

FIG. 30 illustrates determining a hybrid position solution in which sensor parameters (such as bias, scale and drift) are estimated as part of the position/velocity computation in the GNSS and/or WAPS units without need for explicit feedback in an embodiment. For example, the sensor parameters can be included as part of the state vector of the Kalman filter used for tracking the position velocity of the receiver. This architecture provides an optimal solution in that the information is used in one combined filter to update both position and sensor parameters.

Figure 31:
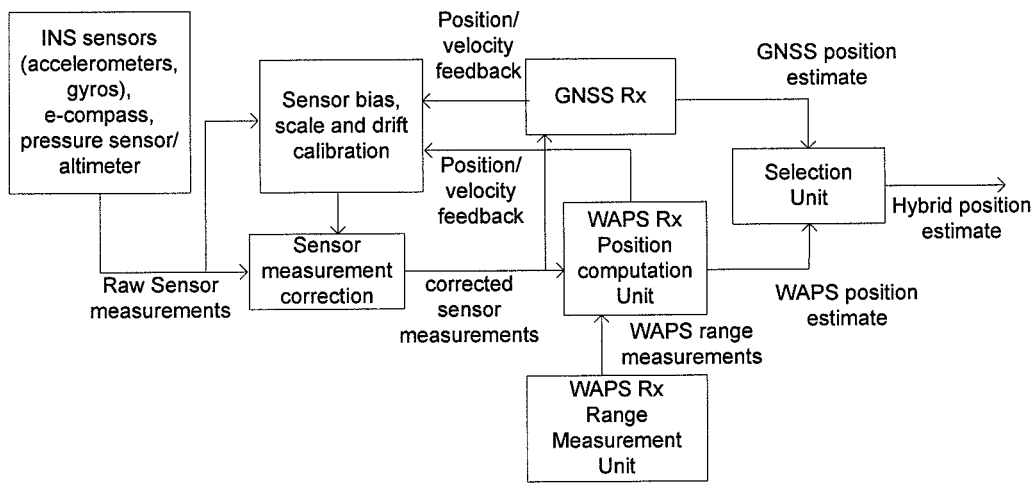
FIG. 31 illustrates determining a hybrid position solution in which sensor calibration is separated from the individual position computation units in an embodiment.
Figure 32:
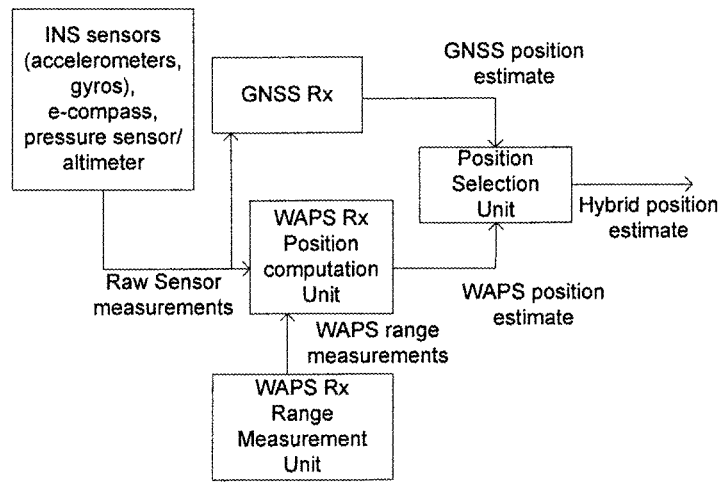
FIG. 32 illustrates determining a hybrid position solution in which a sensor parameter estimation is done as part of the state of the position computation units in an embodiment.

Loose coupling is illustrated in FIG. 31 and FIG. 32 where a selection unit selects between position estimate from the GNSS engine and the WAPS engine. Note that the selection unit may be part of the WAPS or GNSS position units. FIG. 31 illustrates determining a hybrid position solution in which sensor calibration is separated from the individual position computation units in an embodiment. FIG. 32 illustrates determining a hybrid position solution in which the sensor parameter estimation is done as part of the state of the individual position computation units in an embodiment.

The loose coupling methods are generally worse than the tight coupling methods since a selection uses information only from one system. Amongst loose coupling or tight coupling methods, the method that uses the ranges along with raw sensor measurements to determine position and sensor parameters in one optimal filter are better than when sensor parameters and position are computed separately. As a result, the preferred method from a performance perspective is the tight coupling system with implicit sensor parameter estimation. However, depending on the hardware software platform partitioning, one or more of these methods may be easily implemented and may be selected for that reason.

Figure 33:
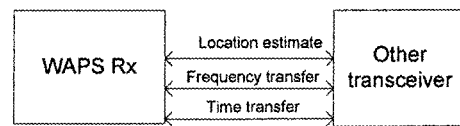
FIG. 33 shows exchange of information in an embodiment.

Information can also be exchanged between the WAPS system and other transceiver systems on the same platform (such as cell-phone, laptop, PND). The transceiver systems can be, for example, Bluetooth transceiver, WLAN transceiver, FM receiver/transmitter, digital or analog TV system, MediaFLO, satellite communication system such as XM radio/Iridium, Cellular modem transceivers such as GSM UMTS cdma2000 1×/EVDO or WiMax). FIG. 33 shows the exchange of information between the WAPS and other systems in an embodiment. The exchange of information between systems can improve the performance of either system. Since the WAPS system time is aligned to GPS time, the WAPS system can provide good quality timing and frequency estimates to any other system. Time and frequency estimates into the WAPS system can reduce the WAPS acquisition search space in code and frequency. In addition, the WAPS system can provide location information to the other transceiver systems. Similarly, if the other system has location information (partial position eg. Altitude or 2-D position, or full position eg. 3-D position or raw range/pseudo-range/range-difference) available, that location information can be provided with or without a location quality metric to the WAPS system. The range/pseudo-range data should be provided along with the location of transmitter (or other means to compute the range from the transmitter location to any receiver location) to enable usage of this range information in a hybrid solution. The range difference corresponding to two transmitters should be provided along with location of the two transmitters. The WAPS system will use the information to aid its position solution. Alternatively, location information can be provided in the form of ranges (or pseudo-ranges) from known transmitter locations to the receiver device. These ranges (or pseudo-ranges) would be combined with WAPS ranges by the positioning algorithm to compute a hybrid position.

Figure 34:
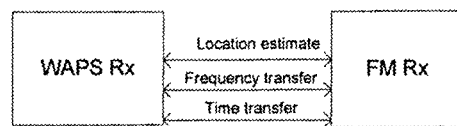
FIG. 34 shows exchange of location, frequency and time estimates between FM receiver and WAPS receiver in an embodiment.
Figure 35:
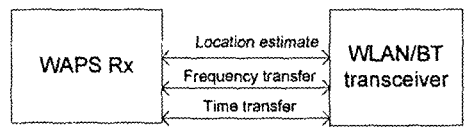
FIG. 35 is a block diagram showing exchange of location, time and frequency estimates between WLAN/BT transceiver and WAPS Receiver in an embodiment.
Figure 36:
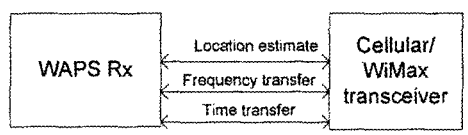
FIG. 36 is a block diagram showing exchange of location, time and frequency estimates between cellular transceiver and WAPS receiver in an embodiment.

Examples of specific systems and information that can be exchanged between them are shown in FIG. 34, FIG. 35, and FIG. 36.

FIG. 34 is a block diagram showing exchange of location, frequency and time estimates between FM receiver and WAPS receiver in an embodiment. The location estimates from WAPS system can be provided to an FM Receiver. This location estimate may then be used, for example, to automatically determine active FM radio stations in the local region. The FM signal may include a RDS–Radio Data Service) transmission as well. If the location of the FM station is included in the RDS/RBDS data-stream (for example, the Location and Navigation (LN) feature that provide data about the transmitter site, giving city and state name and provide DGPS navigation data) then this information can be used to provide location aiding to the WAPS Receiver. The frequency estimate from the WAPS system can be easily used to reduce the FM Receiver tuning time for a particular station. In the other direction, the frequency quality of the estimate in the FM Receiver is based on the FM radio station transmit quality. The time estimate in the WAPS system is based on GPS time and time can be transferred to the FM Receiver to aid timing alignment. Clock Time (CT) feature on RDS/RBDS transmissions may be used to determine timing relative to the RDS data stream and can be transferred to the WAPS receiver.

FIG. 35 is a block diagram showing exchange of location, time and frequency estimates between WLAN/BT transceiver and WAPS Receiver in an embodiment. In general, these WLAN/BT transceivers do not have an accurate frequency estimate and as a result the frequency estimates would be quite coarse, so the transfer of such an estimate from WLAN/BT transceiver to WAPS receiver may have limited value. In the reverse direction, a WAPS frequency estimate can reduce the time taken for frequency acquisition on the WLAN system. The timing information that is extracted, for example, from the timestamp on the wireless LAN AP (Access Point) beacons can be transferred to the WAPS system to aid WAPS acquisition. Note that some reference of the WLAN timing relative to GPS time is needed to make this useful for the WAPS system. Similarly, if the WLAN/BT system has a location estimate (partial position eg. Altitude or 2-D position, or full position eg. 3-D position or raw range/pseudo-range) available, that location information can be provided with or without a location quality metric to the WAPS system. The WLAN position estimate could simply be the geo-location of the serving AP or other "audible" APs in the vicinity. The WLAN position estimate could also be partial, for example, the altitude estimate based on the floor of the AP in question. The WLAN location information can also be a range estimate to a known transmitter AP location (for example, the WLAN system may use Round Trip Time measurements to determine range estimate) or a range difference estimate between two transmit APs.

FIG. 36 is a block diagram showing exchange of location, time and frequency estimates between cellular transceiver and WAPS receiver in an embodiment. Location estimates (partial, complete or raw ranges/range-differences) from cellular systems (such as from TDOA, AFLT or other similar cellular signal FL or RL based positioning method) can be provided to the WAPS system which will use these measurements to obtain a better position estimate. Frequency estimates from the frequency tracking loops of the cellular modem can be provided to the WAPS system to reduce the frequency search space and thus improve WAPS acquisition time (i.e. TTFF). Time estimates from the cellular system can also be provided to the WAPS system to reduce the code search space or to aid bit and frame alignment. For example, systems that are synchronized to GPS time such as cdma2000/1×EVDO can provide fine time estimates for the WAPS system whereas asynchronous (transmissions not synchronized finely to time scale such as GPS) cellular systems such as GSM/GPRS/EGPRS/UMTS may provide coarse time estimates.

Since the WAPS system time is aligned to GPS time, the WAPS system can provide good quality timing and frequency estimates to any other system even if not on the same platform. For example, the WAPS system can be used to provide timing information to a pico/femto-cell BTS through a periodic hardware signal such as a pps (pulse-per-sec) aligned with GPS second-boundaries or a single pulse signal with an associated GPS time.

As described above, the spectrum used by the WAPS system of an embodiment can include licensed or unlicensed bands or frequencies. Alternatively, the WAPS system can use the "White Space" spectrum. The white space spectrum is defined as any spectrum that the WAPS systems senses or determines to be free in a local area (not limited to TV White Space) and transmits location beacons in that spectrum. The transmitters of an embodiment can use spectrum-sensing technology to detect unused spectrum and/or communicate geo-location (can be readily obtained from the GPS timing receiver) to a centralized database that coordinates the spectrum. The receivers can include spectrum-sensing technology to listen to these beacons, or in another embodiment, may be notified of the frequency to which to tune using the communication medium. The WAPS system can adapt to dynamic white space availability or allocation (in cases where the transmitters are required to broadcast their geo-location to a centralized database which then allocates either the spectrum to transmit in and/or the time duration for which it needs to transmit). The WAPS system can continuously broadcast in this spectrum or can share the spectrum with other systems as controlled by a centralized coordination service for the spectrum. The chipping rate and the data rate of the WAPS system components can be modified dynamically to suit the accuracy requirements and/or signal power and bandwidth availability at any given time. The system parameters can be sensed by the receiver or can be communicated to the receiver through the communication medium. The transmitters can form a local network or in cases of spectrum availability in a wider geographical area, can form a continuous network.

The transmitter of an embodiment can also coexist with other networks on the same transmit system in a time-shared fashion. For example, the same spectrum can be used in a time-shared fashion between location and smart grid applications. The transmitter is a broadcast transmitter using the maximum available power levels and can adjust its power levels dynamically based on spectrum sensing or as requested by a centralized coordinating server. The receiver can employ spectrum sensing or can be communicated by a communication medium (which can also be a white space spectrum) of the system parameters and wake up times at that time.

Based on spectrum availability, the WAPS system of an embodiment can use one channel of the TV White space (6 MHz bandwidth) or, if multiple channels are available, can use the multiple frequency bands for better multipath resolution. If adjacent channels are available, channel bonding (e.g., combining adjacent channels) can be used. The increased bandwidth can be used for better multipath resolution, higher chipping rate for higher accuracy, etc. Alternatively, the available bandwidth can be used under FDMA to help solve the near far problem and/or multipath resolution.

White space transmission/reception of WAPS waveforms in two or more white-space bands can enable better and faster integer ambiguity resolution for WAPS carrier phase measurements. This will enable relatively high accuracy (of the order of <1 wavelength) single point positioning using WAPS.

The whitespace bandwidth can also be used as a communication channel in the WAPS (in cases where a reference receiver is used) between the reference receiver at surveyed location and the receiver whose position is to be found.

When a WAPS system in the licensed band is available in a wide area network, a White-Space based local network of towers can be used to augment the location accuracies of the WAPS receiver. The receiver can be designed to listen to both frequencies simultaneously or switch between the licensed band and white space band and tune to the appropriate frequencies.

The White-space bands can also be used to send assistance information to the WAPS, GPS or AGPS systems for location aiding and other assistance information like clock bias, satellite ephemeris etc.

In cases where multiple frequencies with wide separation are available, the WAPS system can be designed to take advantage of the diversity in frequencies to provide better multipath performance.

Encryption and Security

The overhead information in the system of an embodiment can be encrypted using an encryption algorithm. This allows users to use the system and be billed for usage of the system and provide a means to control information security. Keys can be applied to decrypt the signal. The keys can be obtained using a PC, wireless network, hardware dongle or can be burnt into the non volatile memory of the device in a way that it is inaccessible by any unintended sources.

The encryption of an embodiment provides both data security and authentication. The key components that are secured using encryption are the transmitters, the receivers and the server communication. Transmitter Authentication includes unambiguously identifying transmitters so that malicious transmitters can be rejected. Receiver Authentication is such that only authentic receivers should be able to utilize the transmitted information. Receiver Authorization is such that only receivers that are authorized (authentic receiver) should be permitted to operate. Server Communication is encrypted such that communication between the receivers and the server and between the transmitters and the server has to be secure. User data protection is also encrypted because location tracking user databases require protection from unauthorized access.

Encryption methods of an embodiment can be broadly classified into two types: symmetric key cryptography and asymmetric key cryptography. Symmetric Key encryption provides both authentication and encryption, whereas asymmetric key encryption provides authentication of the private key owner, since the public key is available to anyone. Symmetric Key encryption of data is an order of magnitude faster given similar resources. 3DES and AES are examples of symmetric key cryptography. A combination of both methods is used as part of the encryption architecture of an embodiment.

Over-the-air (OTA) broadcast messages can comprise general broadcast messages or system messages. General broadcast messages contain data specific to each transmitter such as location information, transmitter timing counts and other pertinent information that assist a receiver in determining its location. System messages are used to configure encryption keys, enable/disable receivers or for targeted one-way private information exchange to a specific set of receivers.

The general format of a message of an embodiment includes: Message type (parity/ECC protected); Encrypted Message; and Encrypted Message ECC. The ECC for the encrypted message is computed after the message is encrypted.

The OTA broadcast comprises frames that are transmitted periodically, possibly every second. Depending on the channel data rate, a message could be split up (segmented) over multiple frames. Each frame comprises a frame type and frame data. Frame type (parity protected) indicates whether this is the first frame of a message or if it is a continuing frame; it can also indicate a low level format frame that may be used for other purposes. Frame Data is essentially a segmented Message or a low level data frame.

OTA system messages can be encrypted either by the session key or by the transmitter's private key depending upon the system message type. OTA general broadcast messages are encrypted using a symmetric key algorithm with a session key that both the transmitter and receiver have negotiated as described herein. This provides mutual authentication i.e., transmitters can be authenticated by receivers and only authenticated receivers can decode the OTA broadcast. The session key is known to all transmitters and receivers and it is changed periodically. Key change messages are encrypted using the past few session keys, allowing receivers that were not active at a certain time period to sync up to the current session key.

OTA broadcasts also include periodic system messages encrypted by the transmitter's private key. The receivers can unambiguously identify the authenticity of the transmitter by using the associated public key. In the event the session key is compromised, this mechanism ensures that unauthorized transmitters cannot be implemented.

Figure 37:
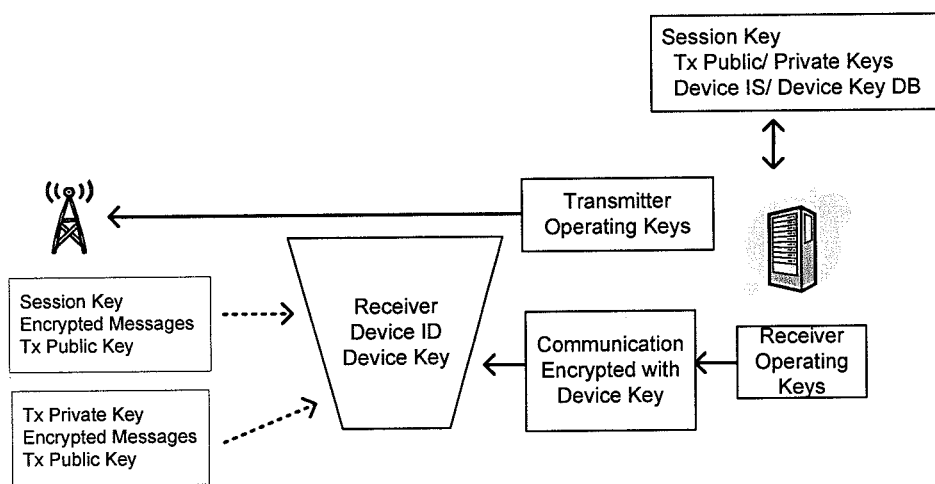
FIG. 37 shows session key setup in an embodiment.
Figure 38:
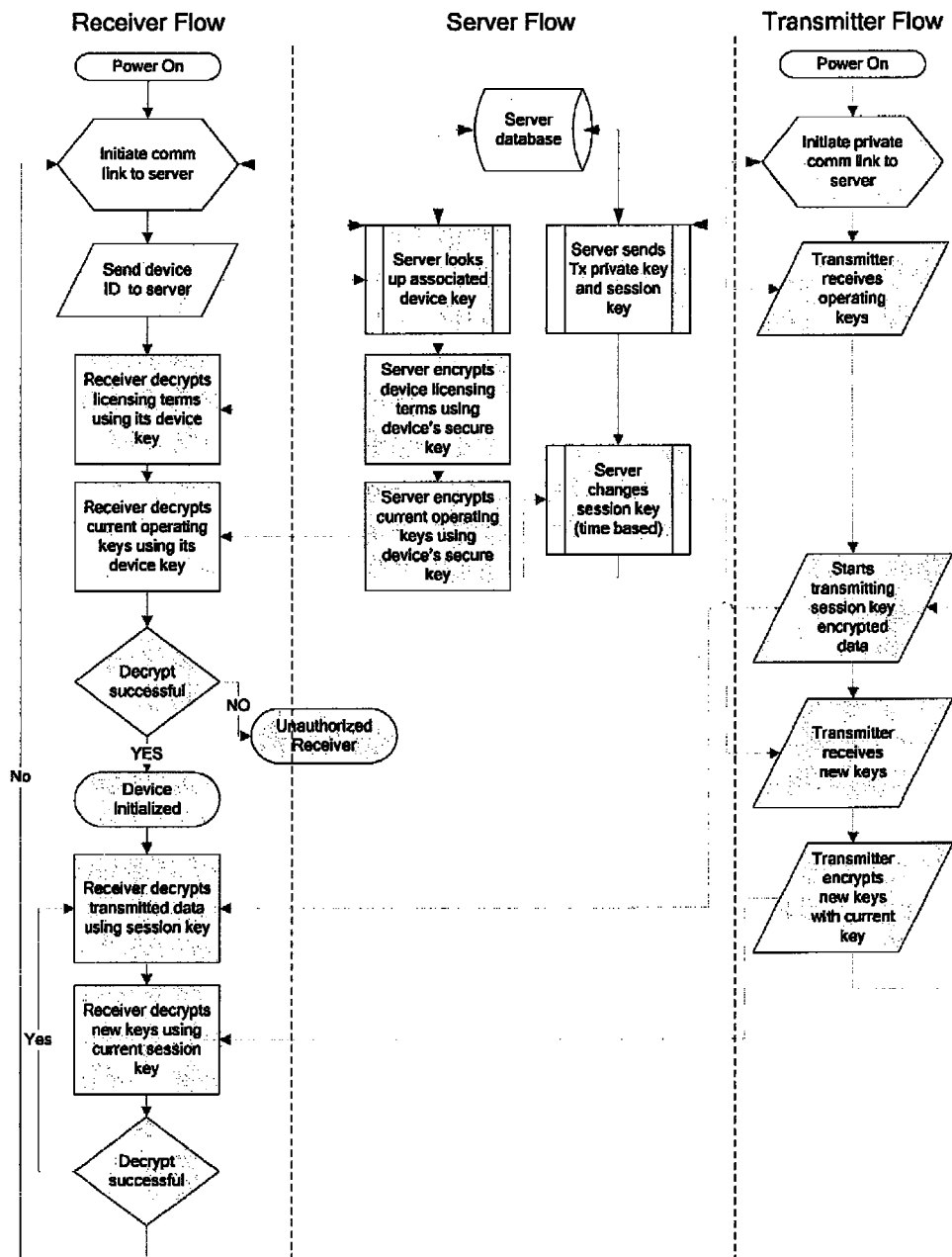
FIG. 38 illustrates encryption in an embodiment.

FIG. 37 shows session key setup in an embodiment. Each receiver is equipped with a unique device ID and a device specific key. FIG. 38 illustrates encryption in an embodiment. The WAPS System data servers maintain a database of the device ID/device specific key pairing. Receiver initialization between a receiver and the WAPS data servers is facilitated using a data connection (GPRS/USB/Modem, etc.) specific to the receiver type. This connection is encrypted using the device specific key after the device identifies itself with the device ID. During this initialization, the current session key, the transmitter public key and licensing terms (i.e., duration the receiver is authorized) are exchanged. Receiver initialization can be performed when the receiver has lost the current session key (initial power up) or if its session key is out of sync (extended power off). The session key is periodically updated, and the new key used for the updating is encrypted using the previous N keys.

The OTA data rate may be inadequate for being the sole mechanism to authorize receivers. However, the system message protocol of an embodiment supports device ID specific and device ID range-based receiver authorization.

A compromised session key requires all receivers to re-initialize. Therefore the session key storage should be tamper-proof in the device. Session key stored outside the device crypto boundary (i.e., attached storage of any kind) will be encrypted using the device's secure key.

A compromised session key cannot be used to masquerade a transmitter because the transmitter periodically transmits authentication information using its private key. Therefore, the transmitter's private key should never be compromised.

Figure 39:
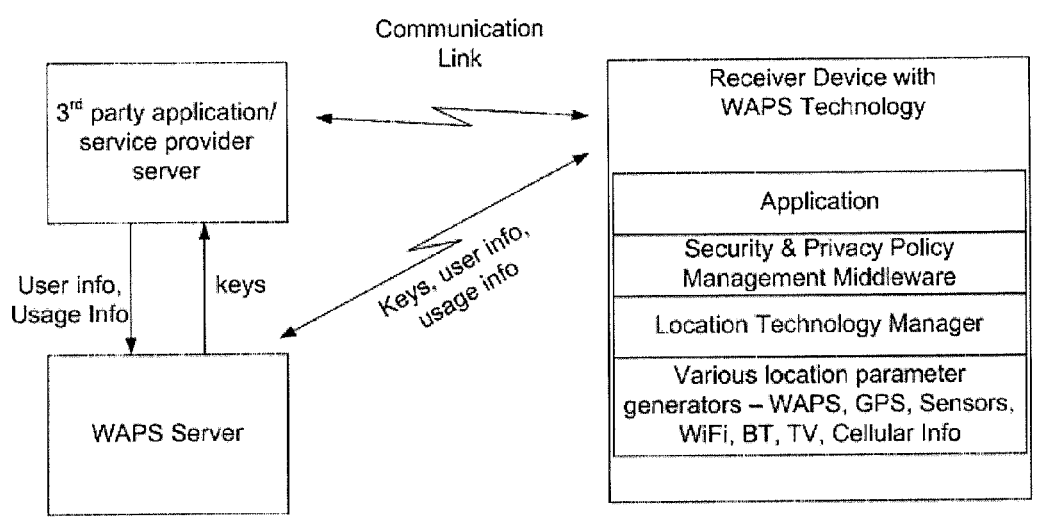
FIG. 39 shows the security architecture for encryption in an embodiment.

In an alternative embodiment, shown in FIG. 39, the keys can be directly delivered to the receiver over the communication link from the WAPS server or can be routed through a third party application or service provider. The keys can have a certain validity period. The keys can be made available on a per-application basis or a per device basis based on a contractual agreement with the customer. Everytime a position request is made either by an application on the receiver or by an application on the network, the keys are checked for validity before retrieving the position or parameters to compute position from the WAPS engine. The key and information exchange to a WAPS server can happen using proprietary protocols or through standard protocols such as OMA SUPL.

The security architecture of the system can be implemented as combination of architectures shown in FIG. 37 and FIG. 39.

Parameter sensors can be integrated into receivers of the WAPS system to time tag and/or location tag the measurements from the sensors. The parameter sensors can include, but are not limited to, temperature sensors, humidity sensors, weight sensors, and sensors for scanner types to name a few. For example, an X-ray detector can be used to determine if a tracked receiver, or device including a tracked receiver, passes through an X-ray machine. The time of the X-ray event and location of the X-ray machine can be tagged by the detector. In addition, other parameter sensors can be integrated into the WAPS system to both time tag and location tag measurements from the sensors.

Users can be billed for the system on a per use, per application on the device, hourly, daily, weekly, monthly and annual basis for an individual or asset.

The location and height of the receiver unit can be sent to any application on the terminal or to the network server using a communication protocol. Alternatively, the raw range measurement can be sent to the network through a communication protocol. The communication protocol can be a standard serial or other digital interface to the application on the terminal or through a standard or proprietary wireless protocol to the server. Possible methods of coupling or connecting to a server through a standard protocol includes the use of SMS messaging to another phone connected to the server or, alternatively, through a wireless data service to a web server. The information sent includes one or more of latitude/longitude, height (if available), and timestamp. The application on the server or the terminal unit can initiate a position fix. The location of the user can be communicated directly from the server or by the application on the server.

The WAPS standalone system independent of a GPS receiver can be used for determining the location of a device. The WAPS system by itself or integrated WAPS and GPS and/or other positioning system can be implemented to co-exist with media storage cards (such as SD cards) on the media cards. The WAPS system by itself or integrated WAPS and GPS system and/or other positioning systems can be implemented to co-exist on a cellular phone Subscriber Identity Module (SIM) card so that the SIM cards can be tracked.

Precise Positioning with Carrier Phase

One method to augment the WAPS system performance to further improve accuracy (up to <1 m) is to implement a carrier phase positioning system as described below. The beacons are set up as usual WAPS transmitters. For this method, it may be desirable (but not essential) to not use TDMA slotting to facilitate easy continuous phase tracking. When TDMA is not used, the near-far problem can be overcome through interference cancellation and increased dynamic range in the receiver. The WAPS receiver to support such a method is capable of measuring and time-stamping code and carrier phase in a continuous manner for all visible satellites. In addition, there is a reference receiver at a known surveyed location that can also make similar measurements of code and carrier phase in a continuous manner. The measurements from the WAPS receiver and the reference receiver may be combined to compute a position either on the device or on the server. The configuration of such a system would be identical to a differential WAPS system.

Carrier phase measurement is more accurate than code phase measurement but contains unknown integer number of carrier phase cycles called integer ambiguity. However there are ways to find integer ambiguities called ambiguity resolution. One method will be considered here that uses extension of local minima search algorithm to iteratively solve for user receiver position and uses measurements at multiple epochs for improved accuracy.

Consider carrier phase measurement at user receiver at a single epoch first as follows.

$$\phi_u^{(k)} = \lambda_{-1} \cdot r_u^{(k)} + N_u^{(k)} + f \cdot (dt_u - dt^{(k)}) + \epsilon_u^{(k)} \tag{1}$$

where $\phi$, $\lambda$, $f$ and $N$ are carrier phase, wavelength, frequency and integer cycles respectively, dt is clock bias, r is range, $\epsilon$ is measurement error and subscript u represents user receiver k represents transmitter number.

Range is given in terms of user and transmitter positions $p_u$ and $p^{(k)}$ as $$r_u^{(k)} = \|p_u - p^{(k)}\| = \sqrt{(p_{ux} - p_x^{(k)})^2 + (p_{uy} - p_y^{(k)})_2 + (p_{uz} - p_z^{(k)})^2} \tag{2}$$

To eliminate error in the knowledge of transmitter clock bias consider another receiver at known position (called reference receiver) with corresponding carrier phase equation $$\phi_r^{(k)} = \lambda_{-1} \cdot r_r^{(k)} + N_r^{(k)} + f \cdot (dt_r - dt^{(k)}) + \epsilon_r^{(k)} \tag{3}$$

where subscript r stands for reference receiver and subtract (2) from (1) to get $$\phi_u^{(k)} - \phi_r^{(k)} = \lambda^{-1} \cdot (r_u^{(k)} - r_r^{(k)}) + (N_u^{(k)} - N_r^{(k)}) + f \cdot (dt_u - dt_r) + (\epsilon_u^{(k)} - \epsilon_r^{(k)}) \tag{4}$$

which is written as $$\phi_{ur}^{(k)} = \lambda^{-1} \cdot r_{ur}^{(k)} + N_{ur}^{(k)} + f \cdot dt_{ur} + \epsilon_{ur}^{(k)} \tag{5}$$

where $(\bullet)_{ur} = (\bullet)_u - (\bullet)_r$.

Since $dt_u r$ is not of interest it can be eliminated by differencing (5) for different values of index (k) to get so called double difference observable equation $$\phi_{ur}^{(kl)} = \lambda^{-1} \cdot r_{ur}^{(kl)} + N_{ur}^{(kl)} + \epsilon_{ur}^{(kl)} \tag{6}$$

where $(\bullet)_{ur}^{(kl)} = (\bullet)_{ur}^{(k)} - (\bullet)_{ur}^{(l)}$.

Equation (6) then is an equation in the unknown user position $p_u$ through $r_{ur}^{(kl)}$ as $$r_{ur}^{(kl)} = (r_u^{(k)} - r_r^{(k)}) - (r_u^{(l)} - r_r^{(l)}) = \|p_u - p^{(k)}\| - \|p_u - p^{(l)}\| - \gamma^{(kl)} \tag{7}$$

where $$\gamma^{(kl)} = \|p_r - p^{(k)}\| - \|p_r - p^{(l)}\| \tag{8}$$

Typically transmitter 1 used in double differencing is one of the transmitters and labeling it as 1 for convenience leads to equation in the matrix form as $$\begin{bmatrix} \phi_{ur}^{(21)} \\ \phi_{ur}^{(31)} \\ \vdots \\ \phi_{ur}^{(n)} \end{bmatrix} = \tag{9}$$

$$\lambda^{-1} \cdot \begin{bmatrix} \|p_u - p^{(2)}\| - \|p_u - p^{(1)}\| - \gamma^{(21)} \\ \|p_u - p^{(3)}\| - \|p_u - p^{(1)}\| - \gamma^{(31)} \\ \vdots \\ \|p_u - p^{(n)}\| - \|p_u - p^{(1)}\| - \gamma^{(n1)} \end{bmatrix} + \begin{bmatrix} N_{ur}^{(21)} \\ N_{ur}^{(31)} \\ \vdots \\ N_{ur}^{(n1)} \end{bmatrix} + \begin{bmatrix} \epsilon_{ur}^{(21)} \\ \epsilon_{ur}^{(31)} \\ \vdots \\ \epsilon_{ur}^{(n1)} \end{bmatrix}$$

or $$\phi = \lambda^{-1} \cdot f(p_u) + N + \epsilon \tag{10}$$

Equation (10) is a nonlinear equation in unknown user position $p_u$. Local minima search algorithm works on linear equations and so (10) is linearized and solved iteratively as follows. Let at iteration m, approximation to $p_u$ is $p_u^m$ where $$p_u = p_u^m + \Delta p_u \tag{11}$$

and $$f(p_u) = f(p_u^m + \Delta p_u) \approx f(p_u^m) + \frac{\partial f}{\partial p_u}(p_u^m) \cdot \Delta p_u \tag{12}$$

where $$\frac{\partial f}{\partial p_u}(p_u) = \begin{bmatrix} l^{(2)} - l^{(1)} \\ l^{(3)} - l^{(1)} \\ \vdots \\ l^{(n)} - l^{(1)} \end{bmatrix}, \tag{13}$$

where $l^{(k)}$ is line-of-sight row vector $$l^{(k)} = \frac{p_u - p^{(k)}}{\|p_u - p^{(k)}\|}$$

Then equation (10) is written as, $$y = G \cdot x + N + \epsilon \tag{13}$$

where $y = \phi - \lambda^{-1} \cdot f(p_u^m)$, $$G = \lambda^{-1} \cdot \frac{\partial f}{\partial p_u}(p_u^m),$$

and $x = \Delta p_u$

Equation (13) is linear in $x = \Delta p_u$ and is solved for $\Delta p_u$ using local minima search algorithm given below. Using so obtained solution of $\Delta p_u$ equation (11) is used to get $p_u$ at iteration m and then so obtained $p_u$ is used as $p_u^{m+1}$ at the next iteration (m+1). The iterations are continued till $\Delta p_u$ becomes small enough to decide convergence. At the beginning of iterations $p_u^0$ can be taken from code phase based solution.

Now consider solving equation (13). Let $Q_{dd}$ be covariance matrix of double difference carrier phase error vector. It is obtained as follows. Variance of error in single difference observable $\phi_{ur}^{(k)} = \phi_u^{(k)} - \phi_r^{(k)}$ is $Q_u + Q_r$ where $Q_u$ and $Q_r$ are respective carrier phase error variances which are assumed to be independent of transmitter k. Variance of $\phi_{ur}^{(kl)} = \phi_{ur}^{(k)} - \phi_{ur}^{(l)}$ is $2(Q_u + Q_r)$ and cross-variance between $\phi_{ur}^{(jl)} = \phi_{ur}^{(j)} - \phi_{ur}^{(l)}$ and $\phi_{ur}^{(kl)} = \phi_{ur}^{(k)} - \phi_{ur}^{(l)}$, $j \neq k$ is $Q_u + Q_r$ which is variance of the common term $\phi_{ur}^{(l)}$. So, $$Q_{dd} = (Q_u + Q_r) \cdot \begin{bmatrix} 2 & 1 & \dots & 1 \\ 1 & 2 & \dots & 1 \\ \vdots & \vdots & \ddots & \vdots \\ 1 & 1 & \dots & 2 \end{bmatrix} \quad (14)$$

Weighted least squares solution of (13) is:

$$\hat{x} = G^L \cdot (y - N) \quad (15)$$

where $G^L$ is left inverse of G, $G^L = (G^T \cdot Q_{dd}^{-1} \cdot G)^{-1} \cdot G^T \cdot Q_{dd}^{-1}$ Vector of residuals is then $$(Y-N) - G \cdot \hat{x} = (y-N) - G \cdot G^L (y-N) = (I - G \cdot G^L)(y-N) = S(y-N) \quad (16)$$

which is a function of N and local minima search tries to minimize weighted norm square of residuals with respect to N as $$\min c(N) = (y-N)^T \cdot W \cdot (y-N), \quad (17)$$

where $W = S^T \cdot Q_{dd}^{-1} \cdot S$ and $S = I - G \cdot G^L$

To solve (17) consider solving $$W \cdot N \approx W \cdot y \quad (18)$$

under the constraint that N is integer. Then $W \cdot (y-N) \approx 0$ and $(y-N)^T \cdot W^T \cdot W \cdot (y-N) = (y-N)^T \cdot W \cdot (y-N) = c(N) \approx 0$ because W is idempotent ($W^T = W$ and $W \cdot W = W$). Thus search for N is limited to those N which satisfy (18).

Once N is solved for estimate of $x = \Delta p_u$ is obtained from equation (15).

Matrices G and $G^L$, of dimensions $(n-1) \times 3$ and $3 \times (n-1)$ respectively have rank 3 each since $(n-1) > 3$ and so $(n-1) \times (n-1)$ matrices S and W will fall short from full rank of $(n-1)$ by 3.

Using QR decomposition of W (LU decomposition could also be used) on equation (18), $$R \cdot N = Q^T \cdot W \cdot y \quad (19)$$

where Q is ortho-normal matrix ($Q^{-1} = Q^T$) and R is upper triangular so that $$\begin{bmatrix} R_{11} & R_{12} \\ 0 & 0 \end{bmatrix} \cdot \begin{bmatrix} N_1 \\ N_2 \end{bmatrix} = \begin{bmatrix} (Q^T \cdot W \cdot y)_{11} \\ \approx 0 \end{bmatrix} \quad (20)$$

and then $$N_1 = \text{round}\{R_{11}^{-1} \cdot ((Q^T \cdot W \cdot y)_{11} - R_{12} \cdot N)\} \quad (21)$$

Thus solution of $$N = \begin{bmatrix} N_1 \\ N_2 \end{bmatrix}$$

is obtained by searching for $N_2$ in 3 dimensional box with integer values, obtaining $N_1$ from (21), and picking that N which minimizes c(N) in (17). Search for $N_2$ is centered on the value of $N_2$ from the previous iteration. At the zero-th iteration $N_2$ latter part of N which is obtained as fractional part of $\lambda^{-1} \cdot f(p_u^0)$; $p_u^0$ being the code phase based solution. The size of the 3 dimensional search box depends on the uncertainty in the code phase based solution. This box can be divided into smaller sub-boxes and center of each smaller size sub-box can be tried as initial $p_u^0$.

The above method used a single epoch (instant) of measurement to determine position. The description below explains an extension to the single epoch method Multiple epoch measurements are taken close enough in time wherein user receiver movement is negligible. Further, integer ambiguities of the initial epoch remain the same for subsequent epochs so that no new unknown integer ambiguities are introduced at subsequent epochs. Multiple epoch measurements do not give independent equations because transmitter locations are fixed (unlike in the GNSS case where motion of satellite transmitters change line-of-sight and thus give independent equations). So multiple epoch measurements do not help in solving for integer ambiguities as float ambiguities (unlike in GNSS case when number of independent equations become greater than number of unknown ambiguities plus three position coordinates). However, multiple epoch measurements allow more carrier phase measurement errors and still allow successful ambiguity resolution. In the multiple epoch case equation (13) becomes $$y = \begin{bmatrix} y_1 \\ y_2 \\ \vdots \\ y_m \end{bmatrix} = \begin{bmatrix} G \\ G \\ \vdots \\ G \end{bmatrix} \cdot x + \begin{bmatrix} N \\ N \\ \vdots \\ N \end{bmatrix} + \begin{bmatrix} \varepsilon_1 \\ \varepsilon_2 \\ \vdots \\ \varepsilon_m \end{bmatrix} \quad (22)$$

Following development for single epoch case as above equation, the problem reduces to problem of finding N such that $$\min c(N) = \left( y - \begin{bmatrix} N \\ N \\ \vdots \\ N \end{bmatrix} \right)^T \cdot \overline{W} \cdot \left( y - \begin{bmatrix} N \\ N \\ \vdots \\ N \end{bmatrix} \right), \quad (23)$$

where $$\overline{W} = \overline{S}^T \cdot \overline{Q_{dd}^{-1}} \cdot \overline{S},$$

$$\overline{S} = I - \overline{G} \cdot \overline{G}^L,$$

$$\overline{G}^L = (\overline{G}^T \cdot \overline{Q_{dd}^{-1}} \cdot \overline{G})^{-1} \cdot \overline{G}^T \cdot \overline{Q_{dd}^{-1}}$$

$$\overline{G} = \begin{bmatrix} G \\ G \\ \vdots \\ G \end{bmatrix}$$

$$\overline{Q_{dd}^{-1}} = \begin{bmatrix} Q_{dd}^{-1} & 0 & \dots & 0 \\ 0 & Q_{dd}^{-1} & \dots & 0 \\ \vdots & \vdots & \ddots & \vdots \\ 0 & 0 & \dots & Q_{dd}^{-1} \end{bmatrix}$$

And to solve (23) for N consider solving $$\overline{W} \cdot \overline{I} \cdot N \approx \overline{W} \cdot y \quad (24)$$

where $$\overline{I} = \begin{bmatrix} I \\ I \\ \vdots \\ I \end{bmatrix}$$

using QR decomposition of $\overline{W} \cdot I$ (LU decomposition could also be used) and following equations of (19) to (21) as above. Again, once N is solved for estimate of $x=\Delta p_u$ is obtained from equation (15). If this estimate of $x=\Delta p_u$ is small then iterations in equation (11) are stopped to obtain user position $p_u$. Typically if each component of x is less than 1e-6 in magnitude then convergence is declared and iterations are stopped.

The next step is to verify whether the converged user position $p_u$ is the right one. This is done based on residuals obtained from (10) as $\mod(\phi-\lambda_{-1} \cdot \theta(p_u)-N, \lambda)$. If maximum of absolute values of residuals for each epoch is less than $\kappa \cdot \sqrt{Q_r}$ then converged solution is accepted as a solution otherwise the search is continued by selecting a new sub-box. Typically scale factor $\kappa$ in the verification test can be chosen to be 5. Once the solution is verified, the differential WAPS system described above can achieve accuracy close to or better than 1 m.

This differential WAPS carrier phase system may be overlaid on top of the traditional WAPS system through the addition of reference receivers or can be standalone. The differential WAPS carrier phase system can be used to deliver high accuracy positioning in certain localized target areas (such as malls, warehouses etc.).

The system described herein for use in position/timing accuracy can be used in one or more of the following applications in both local areas and wide areas, but is not limited to the following applications: asset tracking; people tracking; pet tracking; fire safety; mobile advertising; ad hoc position determination for public safety applications (e.g., a set of "mobile" transmitters can be moved to the location (for example, location of a fire) and those transmitters would form a local network to provide location signals to a set of receivers in that vicinity); military applications (e.g., transmitters can be deployed in an ad hoc fashion on the land or over the air to get precise indoor positions); adaptable bandwidth for applications that can provide the bandwidth to meet the accuracy needs; container tracking and vehicles that move containers around in indoor environments; geo-tagging; geo-fencing; E911 applications; palette tracking for medical applications and other applications that require palette tracking; femto-cells; timing references for femto-cells, timing receivers; providing location for security applications that authenticates based on location both indoors and outdoors; homing application (e.g., pet/asset tracking using WAPS and providing pedestrian navigation to the asset/pet using mobile phone). The WAPS system by itself or integrated with other location technologies can be further integrated into existing local area and/or wide area asset tracking and/or positioning systems.

The embodiments described herein include a positioning system comprising: a transmitter network comprising a plurality of transmitters that broadcast positioning signals; a remote receiver that acquires and tracks at least one of the positioning signals and satellite signals, wherein the satellite signals are signals of a satellite-based positioning system, wherein a first operating mode of the remote receiver comprises terminal-based positioning in which the remote receiver computes a position of the remote receiver from at least one of the positioning signals and the satellite signals; and a server coupled to the remote receiver, wherein a second operating mode of the remote receiver comprises network-based positioning in which the server computes a position of the remote receiver from at least one of the positioning signals and the satellite signals, wherein the remote receiver receives and transfers to the server at least one of the positioning signals and the satellite signals.

The embodiments described herein include a method of determining position, comprising: receiving at a remote receiver at least one of positioning signals and satellite signals, wherein the positioning signals are received from a transmitter network comprising a plurality of transmitters, wherein the satellite signals are received from a satellite-based positioning system; and determining a position of the remote receiver using one of terminal-based positioning and network based positioning, wherein terminal-based positioning comprises computing a position of the remote receiver at the remote receiver using at least one of the positioning signals and the satellite signals, wherein network-based positioning comprises computing a position of the remote receiver at a remote server using at least one of the positioning signals and the satellite signals.

The components described herein can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods include: microcontrollers with memory (such as electronically erasable programmable read only memory (EEPROM)), embedded microprocessors, firmware, software, etc. Furthermore, aspects of the systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, HTTPs, FTP, SMTP, WAP, etc.). When received within a computer system via one or more computer-readable media, such data and/or instruction-based expressions of the above described components may be processed by a processing entity (e.g., one or more processors) within the computer system in conjunction with execution of one or more other computer programs. Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list. The above description of embodiments of the systems and methods is not intended to be exhaustive or to limit the systems and methods to the precise forms disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other systems and methods, not only for the systems and methods described above. The elements and acts of the various embodiments described above can be combined to provide further embodiments. These and other changes can be made to the systems and methods in light of the above detailed description. In general, in the following claims, the terms used should not be construed to limit the embodiments to the specific embodiments disclosed in the specification and the claims, but should be construed to include all systems that operate under the claims. Accordingly, the embodiments are not limited by the disclosure herein, but instead the scope of the embodiments is to be determined entirely by the claims. While certain aspects of the embodiments are presented below in certain claim forms, the inventors contemplate the various aspects of the embodiments in any number of claim forms. Accordingly, the inventors reserve the right to add additional claims after filing the application to pursue such additional claim forms for other aspects of the embodiments.

The invention claimed is:

1. A method for estimating one or more positions of a receiver, wherein the method comprises:
generating, for each of a plurality of positioning signals transmitted from a plurality of terrestrial transmitters and received by the receiver, a cross-correlation function by cross-correlating one or more signal samples extracted from that positioning signal with a reference sequence corresponding to that positioning signal;
determining a vector of cross-correlation samples from each cross-correlation function;
identifying, for each of the positioning signals, a time of arrival estimate corresponding to an earliest arriving signal path of one or more signal paths corresponding to that positioning signal using a high resolution time of arrival measurement method; and
estimating a first position of the receiver based on the time of arrival estimate.

2. The method of claim 1, wherein the time of arrival estimate identified for each of the positioning signals is identified by applying the high resolution time of arrival measurement method to the vector of cross-correlation samples corresponding to that positioning signal.

3. The method of claim 1, wherein each vector of cross-correlation samples includes the peak of the cross-correlation function.

4. The method of claim 1, wherein each vector of cross-correlation samples includes a set of cross-correlation samples left of a peak of the cross-correlation function, and a second set of cross-correlation samples right of the peak of the cross-correlation function.

5. The method of claim 1, wherein each reference sequence is a pseudorandom sequence.

6. The method of claim 1, wherein the high resolution time of arrival measurement method is based on at least one of a MUSIC algorithm, an ESPRIT algorithm, or an Eigenspace decomposition method.

7. The method of claim 1, wherein the method comprises:
generating a reference vector from a correlation function determined by a calculated function or a measurement in a channel environment that has low noise and separable or no multipath components.

8. The method of claim 1, wherein the method comprises:
improving a signal-to-noise ratio in the vector by coherently averaging across at least one of a plurality of pseudorandom code frames and a plurality of bits.

9. The method of claim 1, wherein the method comprises:
calculating a Fourier Transform using the vector.

10. The method of claim 1, wherein the method comprises:
generating a frequency domain estimate of a channel;
generating a reduced channel estimate vector from the frequency domain estimate of the channel;
defining an estimated covariance matrix of the reduced channel estimate vector; and
performing singular value decomposition on the estimated covariance matrix.

11. The method of claim 1, wherein the method comprises:
generating a vector of sorted singular values; and
using the vector of sorted singular values to separate signal and noise subspaces.

12. The method of claim 1, wherein the method comprises:
generating a noise subspace matrix.

13. The method of claim 1, wherein the method comprises:
determining the first position of the receiver based on a non-linear objective function and a best estimate of the first position as a set of position parameters that minimize the objective function.

14. The method of claim 1, wherein the method comprises:
determining the first position of the receiver based on a solution to a set of linearized equations using least squares.

15. The method of claim 1, wherein the high resolution time of arrival measurement method is based on at least one of a signal space separation method, a noise space separation method, a singular value decomposition method, or a covariance estimation method.

16. The method of claim 1, wherein the method comprises: estimating one or more additional positions of the receiver during a time period, wherein each of the one or more additional positions are estimated by:
  generating, for each of a plurality of positioning signals transmitted from the plurality of terrestrial transmitters and received by the receiver at that position, a cross-correlation function based on one or more signal samples extracted from that positioning signal and further based on a reference sequence corresponding to that positioning signal;
  determining a vector of cross-correlation samples from each cross-correlation function;
  identifying, for each of the positioning signals, a time of arrival corresponding to an earliest arriving signal path of one or more signal paths corresponding to that positioning signal using the high resolution time of arrival measurement method; and
  estimating that position of the receiver based on the time of arrival corresponding to the earliest arriving signal path.

17. The method of claim 16, wherein the estimate of the first position and the estimate(s) of the one or more additional positions form a set of position estimates, and wherein the method comprises: using the set of position estimates and a Kalman filter to determine a position solution versus time.

18. One or more non-transitory computer-readable media embodying program instructions adapted to be executed to implement a method for estimating one or more positions of a receiver, wherein the method comprises:
  generating, for each of a plurality of positioning signals transmitted from a plurality of terrestrial transmitters and received by the receiver, a cross-correlation function based on one or more signal samples extracted from that positioning signal and further based on a reference sequence corresponding to that positioning signal;
  determining a vector of cross-correlation samples from each cross-correlation function;
  identifying, for each of the positioning signals, a time of arrival estimate corresponding to an earliest arriving signal path of one or more signal paths corresponding to that positioning signal using a high resolution time of arrival measurement method; and
  estimating a first position of the receiver based on the time of arrival estimate.

19. The non-transitory computer-readable media of claim 18, wherein the time of arrival estimate identified for each of the positioning signals is identified by applying the high resolution time of arrival measurement method to the vector of cross-correlation samples corresponding to that positioning signal.

20. The non-transitory computer-readable media of claim 18, wherein each vector of cross-correlation samples includes the peak of the cross-correlation function.

21. The non-transitory computer-readable media of claim 18, wherein each vector of cross-correlation samples includes a set of cross-correlation samples left of a peak of the cross-correlation function, and a second set of cross-correlation samples right of the peak of the cross-correlation function.

22. The non-transitory computer-readable media of claim 18, wherein the reference sequence is a pseudo-random sequence.

23. The non-transitory computer-readable media of claim 18, wherein the high resolution time of arrival measurement method is based on at least one of a MUSIC algorithm, an ESPRIT algorithm, or an Eigen-space decomposition method.

24. The non-transitory computer-readable media of claim 18, wherein the method comprises:
  generating a reference vector from a correlation function determined by a calculated function or a measurement in a channel environment that has low noise and separable or no multipath components.

25. The non-transitory computer-readable media of claim 18, wherein the method comprises
  improving a signal-to-noise ratio in the vector by coherently averaging across at least one of a plurality of pseudorandom code frames and a plurality of bits.

26. The non-transitory computer-readable media of claim 18, wherein the method comprises:
  calculating a Fourier Transform using the vector.

27. The non-transitory computer-readable media of claim 18, wherein the method comprises:
  generating a frequency domain estimate of a channel;
  generating a reduced channel estimate vector from the frequency domain estimate of the channel;
  defining an estimated covariance matrix of the reduced channel estimate vector; and
  performing singular value decomposition on the estimated covariance matrix.

28. The non-transitory computer-readable media of claim 18, wherein the method comprises:
  generating a vector of sorted singular values; and
  using the vector of sorted singular values to separate signal and noise subspaces.

29. The non-transitory computer-readable media of claim 18, wherein the method comprises:
  generating a noise subspace matrix.

30. The non-transitory computer-readable media of claim 18, wherein the method comprises:
  determining the first position of the receiver based on a non-linear objective function and a best estimate of the first position as a set of position parameters that minimize the objective function.

31. The non-transitory computer-readable media of claim 18, wherein the method comprises:
  determining the first position of the receiver based on a solution to a set of linearized equations using least squares.

32. The non-transitory computer-readable media of claim 18, wherein the high resolution time of arrival measurement method is based on at least one of a signal space separation method, a noise space separation method, a singular value decomposition method, or a covariance estimation method.

33. The non-transitory computer-readable media of claim 18, wherein the method comprises: estimating one or more additional positions of the receiver during a time period, wherein each of the one or more additional positions are estimated by:
  generating, for each of a plurality of positioning signals transmitted from the plurality of terrestrial transmitters and received by the receiver at that position, a cross-correlation function based on one or more signal samples extracted from that positioning signal and further based on a reference sequence corresponding to that positioning signal;

determining a vector of cross-correlation samples from each cross-correlation function;

identifying, for each of the positioning signals, a time of arrival corresponding to an earliest arriving signal path of one or more signal paths corresponding to that positioning signal using the high resolution time of arrival measurement method; and estimating that position of the receiver based on the time of arrival corresponding to the earliest arriving signal path.

34. The non-transitory computer-readable media of claim 33, wherein the estimate of the first position and the estimate(s) of the one or more additional positions form a set of position estimates, and wherein the method comprises: using the set of position estimates and a Kalman filter to determine a position solution versus time.

35. A system for estimating one or more positions of a receiver, wherein the system is operable to:

generate, for each of a plurality of positioning signals transmitted from a plurality of terrestrial transmitters and received by the receiver, a cross-correlation function based on one or more signal samples extracted from that positioning signal and further based on a reference sequence corresponding to that positioning signal;

determine a vector of cross-correlation samples from each cross-correlation function;

identify, for each of the positioning signals, a time of arrival estimate corresponding to an earliest arriving signal path of one or more signal paths corresponding to that positioning signal using a high resolution time of arrival measurement method; and estimate a first position of the receiver based on the time of arrival estimate.

* * * * *